US011625695B2

(12) United States Patent
Hearn et al.

(10) Patent No.: US 11,625,695 B2
(45) Date of Patent: Apr. 11, 2023

(54) PROTOCOL FRAMEWORK FOR SUPPORTING PROTOCOL FLOWS

(71) Applicant: R3 Ltd., London (GB)

(72) Inventors: Michael Christopher Hearn, Zurich (CH); Qurratul Ain Shams Asari, London (GB)

(73) Assignee: R3 Ltd., London (GB)

( * ) Notice: Subject to any disclaimer, the term of this patent is extended or adjusted under 35 U.S.C. 154(b) by 503 days.

(21) Appl. No.: 16/680,108

(22) Filed: Nov. 11, 2019

(65) Prior Publication Data

US 2020/0082363 A1  Mar. 12, 2020

Related U.S. Application Data

(60) Division of application No. 15/364,213, filed on Nov. 29, 2016, now Pat. No. 10,521,775, which is a
(Continued)

(51) Int. Cl.
*G06Q 20/06* (2012.01)
*G06Q 20/38* (2012.01)
(Continued)

(52) U.S. Cl.
CPC .......... *G06Q 20/065* (2013.01); *G06Q 20/02* (2013.01); *G06Q 20/382* (2013.01);
(Continued)

(58) Field of Classification Search
CPC .... G06Q 20/065; G06Q 20/02; G06Q 20/382; G06Q 20/3825; G06Q 20/3827;
(Continued)

(56) References Cited

U.S. PATENT DOCUMENTS 8,478,616 B2   7/2013  De Klerk et al.
10,521,775 B2  12/2019 Hearn et al.
(Continued)

FOREIGN PATENT DOCUMENTS

CN   105635169 A  *  6/2016 ............. G06Q 10/10
EP   2031817 A1      3/2009
(Continued)

OTHER PUBLICATIONS

Andreas M. Antonopoulos, Mastering Bitcoin, Dec. 2014, O'Reilly Media, Inc. (Year: 2014).*
(Continued)

*Primary Examiner* — Neha Patel
*Assistant Examiner* — Chunling Ding
(74) *Attorney, Agent, or Firm* — Perkins Coie LLP

(57) ABSTRACT

A method and system are provided to support a decentralized distributed ledger in which transactions are recorded by parties to the transactions without the use of a blockchain. A distributed ledger system provides a protocol framework that supports the development of protocol flows. A protocol flow is computer code that controls the performance of a transaction by the party or parties to the transaction. Protocol flows can be developed for different types of transactions. The distributed ledger system allows transactions to be proposed, accepted, and notarized by a notary and stored without the use of a blockchain ledger. The distributed ledger system can avoid the expense of the computational and storage resources needed to redundantly verify a transaction and store evidence on the many nodes of a blockchain distributed ledger.

29 Claims, 17 Drawing Sheets

Related U.S. Application Data continuation-in-part of application No. 15/243,902, filed on Aug. 22, 2016, now Pat. No. 10,529,042.

(60) Provisional application No. 62/427,685, filed on Nov. 29, 2016, provisional application No. 62/323,952, filed on Apr. 18, 2016.

(51) Int. Cl.

| | | |
|---|---|---|
| *G06Q 20/02* | (2012.01) | |
| *G06Q 40/12* | (2023.01) | |
| *G06Q 50/18* | (2012.01) | |
| *H04L 9/32* | (2006.01) | |
| *H04L 9/00* | (2022.01) | |

(52) U.S. Cl.
CPC ..... *G06Q 20/3825* (2013.01); *G06Q 20/3827* (2013.01); *G06Q 20/3829* (2013.01); *G06Q 40/12* (2013.12); *G06Q 50/18* (2013.01); *H04L 9/3236* (2013.01); *H04L 9/3247* (2013.01); *H04L 9/3297* (2013.01); *G06Q 2220/00* (2013.01); *H04L 9/50* (2022.05); *H04L 2209/56* (2013.01)

(58) Field of Classification Search
CPC .... G06Q 20/3829; G06Q 40/12; G06Q 50/18; G06Q 2220/00; G06Q 20/381; G06Q 20/389; H04L 9/3236; H04L 9/3247; H04L 9/3297; H04L 2209/38; H04L 2209/56; H04L 9/3239; H04L 9/50
See application file for complete search history.

(56) References Cited

U.S. PATENT DOCUMENTS

| | | | |
|---|---|---|---|
| 10,529,041 B2 | 1/2020 | Brown et al. | |
| 10,529,042 B2 | 1/2020 | Brown et al. | |
| 10,803,537 B2 | 10/2020 | Brown et al. | |
| 11,263,605 B2 | 3/2022 | Chalkias | |
| 2002/0019937 A1 | 2/2002 | Edstrom et al. | |
| 2002/0178122 A1* | 11/2002 | Maes | G06Q 20/401 705/64 |
| 2008/0153479 A1* | 6/2008 | Venkitaraman | H04W 72/005 455/426.1 |
| 2012/0030094 A1* | 2/2012 | Khalil | G06Q 10/06 705/39 |
| 2012/0096274 A1 | 4/2012 | Campagna et al. | |
| 2012/0317412 A1 | 12/2012 | Zaverucha et al. | |
| 2013/0170642 A1 | 7/2013 | Brown et al. | |
| 2014/0325227 A1 | 10/2014 | Brown | |
| 2014/0344579 A1 | 11/2014 | Struik et al. | |
| 2016/0044028 A1* | 2/2016 | Cha | H04L 63/0853 726/4 |
| 2016/0283202 A1* | 9/2016 | Sellers-Blais | G06F 8/41 |
| 2017/0109735 A1 | 4/2017 | Sheng et al. | |
| 2017/0153881 A1* | 6/2017 | Bortnikov | G06F 8/656 |
| 2017/0300872 A1 | 10/2017 | Brown et al. | |
| 2017/0301033 A1 | 10/2017 | Brown et al. | |
| 2017/0301047 A1 | 10/2017 | Brown et al. | |
| 2017/0352012 A1 | 12/2017 | Hearn | |
| 2017/0353309 A1 | 12/2017 | Gray et al. | |
| 2018/0075527 A1 | 3/2018 | Nagla et al. | |
| 2018/0240107 A1* | 8/2018 | Andrade | G06Q 20/36 |
| 2018/0365448 A1* | 12/2018 | Uhr | G06Q 20/36 |
| 2019/0052454 A1* | 2/2019 | Wright | H04L 9/0861 |
| 2019/0057382 A1* | 2/2019 | Wright | H04L 9/0891 |
| 2019/0179933 A1 | 6/2019 | Wang et al. | |
| 2020/0074422 A1 | 3/2020 | Hearn et al. | |
| 2020/0082362 A1 | 3/2020 | Hearn et al. | |
| 2020/0082364 A1 | 3/2020 | Hearn et al. | |
| 2020/0302409 A1 | 9/2020 | Hearn et al. | |
| 2020/0349532 A1 | 11/2020 | Brown et al. | |

FOREIGN PATENT DOCUMENTS

| | | | | |
|---|---|---|---|---|
| EP | 3549080 A1 | 10/2019 | | |
| FR | 3018379 A1 | * 9/2015 | ......... | G06Q 20/0655 |
| WO | 2017182788 A1 | 10/2017 | | |
| WO | 2018100371 A1 | 6/2018 | | |

OTHER PUBLICATIONS

International Search Report and Written Opinion issued for PCT/GB2017/053504 and dated Mar. 16, 2018.
International Search Report and Written Opinion issued for PCT/GB2019/051589 and dated Nov. 27, 2019.
Anonymous: "Transport Layer Security—Wikipedia", Jun. 23, 2017, https://en.wikipedia.org/w/index.php?title=Transport_Layer_Security&oldid=787037092.
Hearn, "Corda: A distributed ledger", Nov. 29, 2016, https://docs.corda.net/releases/release-M10.1/_static/corda-technical-whitepaper.pdf.
Amendment in Response to Non-Final Office Action, filed on Jul. 6, 2021 in U.S. Appl. No. 16/890,285, 14 pages.
Antonopoulos, A. "Mastering Bitcoin" 2014, First Edition, O'Reilly Media, Inc., Chapters 4 and 5 (Year: 2014).
Bernstein, D. J. et al., "SPHINCS: practical stateless has-based signatures," Advances in Cryptology-Eurocrypt 2015—35th Annual International Conference on the Theory and Applications of Cryptographic Techniques, Bulgaria, Apr. 26-30, 2015, p. 368-397.
Bitfury: "Public versus Private Blockchains Part 2: Permissionless Blockchains White Paper," Oct. 20, 2015, retrieved from internet <www.the-blockchain.com/docs/JefGrazikPublicvsPrivateBlockchainpt2> on Jun. 23, 2017.
Castro, Miguel et al. "Practical byzantine fault tolerance and proactive recovery," ACM Transactions on Computer Systems, Nov. 1, 2002, pp. 398-461. retrieved from internet <others.kelehers.me/pbftByzantine>.
Dikshit, P. "Efficient Weighted Threshold ECDSA for Securing Bitcoin Wallet" 2017, IEEE (Year: 2017), 10 pages.
European Patent Office, EP Examination Report, EP Patent Application 17825913.1, dated Apr. 30, 2021, 9 pages.
Florian Tschorsch et al. "Bitcoin and Beyond: A Technical Survey on Decentralized Digital Currencies," International Association for Cryptologic Research, vol. 20150517:090557, May 15, 2015, pp. 1-37.
Gareth William Peters et al. "Understanding Modern Banking Ledgers through Blockchain Technologies: Future of Transaction processing and Smart Contracts on the Internet of Money," Nov. 18, 2015, retrieved from internet.
Google: "Hyperledge Whitepaper" Feb. 17, 2016 (Feb. 17, 2016), XP055342588 retrieved from the Internet: URL:http://www.theblockchain.com/docs/Hyperledger Whitepaper.pdf.
Grigg, I. "The Ricardian contract," Electronic Contracting, 2004. Proceedings First IEEE International Workshop, San Diego CA, Jul. 6, 2004. IEEE Jan. 1, 2004, pp. 25-31.
Grigg, Ian, "Digital Trading," Conference Paper, http://iang.org/papers/digital_trading.html, retrieved Sep. 26, 2016, 19 pages.
Grigg, Ian, "The Ricardian Contract," http://iang.org/papers/ricardian_contract.html/ retrieved Feb. 27, 2017, 7 pages.
International Search Report and Written Opinion issued for PCT/GB2017/051069 and dated Jul. 6, 2017.
International Search Report and Written Opinion issued for PCT/GB2019/050739 dated Jun. 4, 2019, 14 pages.
International Search Report and Written Opinion dated Apr. 20, 2021, App. PCT/US2021/015469.
International Search Report and Written Opinion, PCT Patent Application PCT/GB2017/053604, dated Mar. 16, 2018, 13 pages.
International Search Report and Written Opinion, PCT Patent Application PCT/GB2019/051589, dated Nov. 27, 2019, 20 pages.
Nakamoto, Satoshi, "Bitcoin: A Peer-to-Peer Electronic Cash System," http://www.bitcoin.org/bitcoin.pdf, pp. 1-9, Jul. 4, 2010.
Non-Final Office Action dated Apr. 14, 2021, received in U.S. Appl. No. 16/890,285, 15 pages.

(56) References Cited

OTHER PUBLICATIONS

Notice of Allowance dated Aug. 25, 2021, received in U.S. Appl. No. 16/890,285, 15 pages.
Ricardian Contract, https://en.wikipedia.org/wiki/Ricardian_Contract, 5 pages.
Stellar.Org and Contributors: "Multisignature | Stellar Developers", Apr. 15, 2017, https://web.archive.org/web/20170415150159/https://www.stellar.org/developers/guides/concepts/ulti-sig.html. 9 pages.
Swan, Melanie. "Blockchain: Blueprint for a New Economy," O'Reilly Media Inc., Sebastopol, CA, Feb. 2015, 149 pages.
U.S. Appl. No. 62/427,685, filed Nov. 29, 2016, titled Corda: A Distributed Ledger, 53 pages.
White Paper, https://github.com/ethereum/wiki/wiki/White-Paper, retrieved Feb. 27, 2017, 25 pages.
Wikipedia, "Digital Signatures," retrieved from <https_://en_.wikipedia_.org/w/index.php?title=Digital_signature&oldid=744808460> on Apr. 23, 2021, 11 pages.
Wood, Gavin, "Ethereum: A Secure Decentralised Generalised Transaction Ledger," EIP-150 Revision, http://gavwood.com/paper.pdf, retrieved Mar. 1, 2017, pp. 1-32.

* cited by examiner

PROTOCOL FRAMEWORK FOR SUPPORTING PROTOCOL FLOWS

CROSS-REFERENCE TO RELATED APPLICATION

This application is a divisional of U.S. patent application Ser. No. 15/364,213, filed on Nov. 29, 2016 entitled "SECURE PROCESSING OF ELECTRONIC TRANSACTIONS BY A DECENTRALIZED DISTRIBUTED LEDGER SYSTEM", which claims the benefit of U.S. Provisional Application No. 62/427,685, filed on Nov. 29, 2016 entitled "CORDA: A DISTRIBUTED LEDGER", and claims priority to U.S. patent application Ser. No. 15/243,902 entitled "SYSTEM AND METHOD FOR MANAGING TRANSACTIONS IN DYNAMIC DIGITAL DOCUMENTS", Ser. No. 15/243,473 entitled "SYSTEM AND METHOD FOR MANAGING TRANSACTIONS IN DYNAMIC DIGITAL DOCUMENTS", and Ser. No. 15/243,402 entitled "SYSTEM AND METHOD FOR MANAGING TRANSACTIONS IN DYNAMIC DIGITAL DOCUMENTS", all filed on Aug. 22, 2016, which all claim the benefit of U.S. Provisional Application No. 62/323,952 entitled "SYSTEM AND METHOD FOR MANAGING TRANSACTIONS IN DYNAMIC DIGITAL DOCUMENTS", filed on Apr. 18, 2016; all of which are hereby incorporated by reference in their entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UXTO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by its vehicle identification number. The account for the car identifies the current owner. The current owner creates a transaction against the account for the car that indicates that the transaction is a transfer of ownership transfer, indicates the public keys (i.e., identity tokens) of the current owner and the next owner, and indicates the identity token of the car. The transaction is signed by the private key of the current owner and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard. Although the execution of the computer code at each node helps ensure the authenticity of the blockchain, it requires large amounts of computer resources to support such redundant execution of computer code.

The term "contract" has been used to describe the computer code of a contract under the UXTO model of bitcoin and the computer code of the "smart contracts" model of the Ethereum platform. The "contracts" under these models are, however, different. In the UXTO model, the distributed ledger is a set of immutable rows keyed by (hash: output index) values. The "hash" is a hash of the transaction that generated the output represented by the row, and the "output index" identifies which one of the possibly many outputs of the transaction that the row represents. A UXTO contract is deterministic and performs no processing other than validating the inputs to the transaction. In the "smart contract" model, the computer code of the smart contract is an instantiation of the computer code that is maintained by every node that stores the block chain. A "smart contract" can perform virtually any type of processing such as receiving messages, sending messages, accessing external databases, and so on.

DETAILED DESCRIPTION

Figure 1:
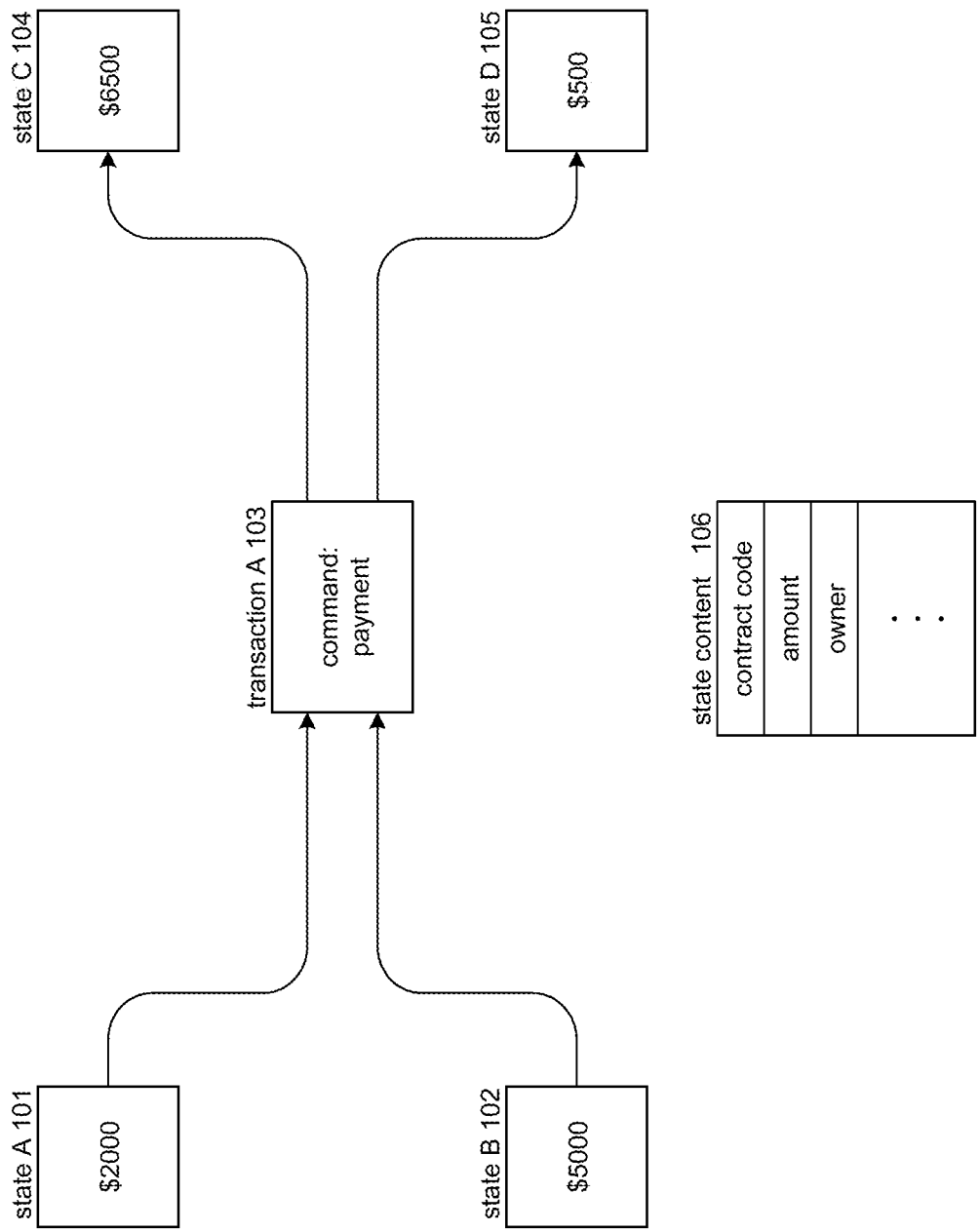
FIG. 1 is a diagram that illustrates an example a transaction in some embodiments.

A method and system are provided to support a decentralized distributed ledger in which transactions are recorded by parties to the transactions without the use of a blockchain. In some embodiments, a distributed ledger system provides a protocol framework that supports the development of protocol flows. A protocol flow is computer code that controls the performance of a transaction by the party or parties to the transaction. Protocol flows can be developed for different types of transactions, such as a transaction to sell an asset from a selling party to a buying party, a transaction to support an interest rate swap, a transaction involving more than two parties, and so on. An example will help illustrate a protocol flow. In this example, a "transfer" transaction specifies to transfer a certain amount of money from an "originator" party to an "responder" party. To support such a transfer transaction, a transfer protocol flow would be developed that includes computer code for the party in the role of the originator ("originator code") and computer code for the party in the role of responder ("responder code"). When the two parties agree to consummate the transaction, they agree on the particulars of the transaction, such as the amount of money to transfer, the notary who is responsible for notarizing the transaction, and to use the transfer protocol flow.

Continuing with the example of the transfer transaction, to record the transfer transaction, the originator party starts execution of the originator code of the transfer protocol flow, and the responder party starts execution of the responder code of the transfer protocol flow. The originator party provides the particulars of the transaction to the originator code. The originator code then sends to the responder party its public key and the particulars of the transaction. Upon receiving the public key and the particulars of the transaction, the responder code verifies the particulars of the transaction (e.g., prompting a user to confirm the price), generates a proposed transaction that outlines the particulars of the transaction, signs the proposed transaction with the signature of the responder party (e.g., using a private key of the responder party), and sends the proposed transaction to the originator code. The proposed transaction specifies input state, output state, and identification of a notary. The input state may specify the funds used to buy the asset, and the output state may specify that ownership of the asset has been transferred. The input state and the output state include contract code that is used to verify whether the transaction is valid. Upon receiving the proposed transaction, the originator code verifies the proposed transaction by verifying that the proposed transaction was signed by the responder party (e.g., using the public key of the responder party), verifying that the particulars of the proposed transaction match those sent to the responder party, and executing the contract code of the input state and output state of the proposed transaction to determine whether the proposed transaction is valid according to the contract code. When the proposed transaction is valid, the originator code accepts the proposed transaction by signing the proposed transaction with the signature of the originator party to generate an accepted transaction. The originator code then sends the accepted transaction to notary code of the notary specified in the proposed transaction. The notary code may be considered computer code of the transfer protocol code for the role of notary. Execution of the notary code may have started when the parties decided to consummate the transaction.

Continuing with the example, when the notary code receives the accepted transaction, the notary verifies that the accepted transaction has been signed by the originator party and the responder party. The notary then determines whether the input state to the accepted transaction has been already consumed (e.g., spent by another transaction). The notary may maintain a consumed state storage to track the output states that have been consumed by transactions. If the input state has not been consumed, then the notary code marks the output state of the transaction that is the input state for the accepted transaction as now consumed and notarizes the accepted transaction by signing the accepted transaction with the signature of the notary to generate a notarized transaction. The notary code then sends the notarized transaction to the originator code.

Continuing with the example, upon receiving the notarized transaction, the originator code verifies that the notarized transaction has been signed by the notary, records the notarized transaction in its ledger, and sends the notarized transaction to the responder code. Upon receiving the notarized transaction, the responder code verifies that the notarized transaction has been signed by the notary and the originating party and records the notarized transaction in its ledger. In this way, both the originator party and the responder party maintain a copy of the notarized transaction in their ledgers as evidence of the notarized transaction. The output state of the notarized transaction can be used as an input state to a subsequent transaction, and the notarized transaction can be provided as evidence that the output state that is being used as an input state in a subsequent transaction is valid output of the notarized transaction. For example, when verifying that the input state of a proposed transaction was a valid output of the prior transaction, the party that sent the proposed transaction may be requested to provide evidence of each prior transaction whose output state is being used as an input state to the proposed transaction. Although the proposed transaction of this example is described as having one input state and one output state, a transaction can have zero or more input states and zero or more output states, as long as the transaction has at least one input state or one output state.

The distributed ledger system thus allows transactions to be proposed, accepted, and notarized by a notary and stored without the use of a blockchain ledger. In this way, the distributed ledger system can avoid the expense of the computational and storage resources needed to redundantly verify a transaction and store evidence on the many nodes of a blockchain distributed ledger.

In some embodiments, the computer code of a protocol flow can be of arbitrary complexity. For example, a protocol flow can be developed to support transactions between any number of parties. In such a case, each party to the transaction would execute computer code for its role in the protocol flow (e.g., insurer, reinsurer) that verifies, signs, and records the transaction as it is passed between parties and to and from the notary.

In some embodiments, the distributed ledger system provides a protocol framework that supports the development and execution of protocol flows. The protocol framework may provide a checkpoint service, a messaging service, a mapping service, a deterministic virtual machine service, a status service, and so on that are used by the protocol flows. In addition, a protocol flow may invoke other protocol flows, referred to as sub-protocol flows, so that many protocol flows can share the same sub-protocol flow that represents activities commonly performed by protocol flows. For example, a sub-protocol flow may be developed to support the processing associated with a party requesting that an accepted transaction be notarized.

In some embodiments, the protocol framework provides a messaging service that securely and reliably sends messages between nodes executing a protocol flow. When a protocol flow at a node is to communicate with another node, the messaging service may establish a session with the other node so that messages can be transmitted securely (e.g., via symmetric encryption). A session may have a universally unique identifier ("UUID"). The messaging service persists sessions across node restarts and network outages. A session is used to group the messages of a protocol flow. The messaging service also ensures delivery of a message and may require a receiving node to confirm receipt of a message (e.g., the confirmation may include a hash of the received message). The messaging service may provide an application programming interface that includes a send message and a receive message function.

In some embodiments, the checkpoint service generates checkpoints during execution of the protocol flow to support the restarting of the protocol flow from the last checkpoint in case of failure. The checkpoint service may generate a checkpoint whenever a protocol flow interacts with the protocol framework. For example, when a protocol flow requests the protocol framework to send a message (e.g., to a notary to request that an accepted transaction be notarized), the protocol framework generates a checkpoint. A checkpoint includes the state of the protocol flow at the time of the checkpoint. For example, the state may include the program counter, register values, the content of the stack, and the content of the heap of the computer code of the protocol flow. The checkpoint service may employ a garbage collection technique to collect the content of the heap that is currently accessible to the program. The checkpoint service then stores the checkpoint persistently. If execution of the protocol flow terminates, such as by a power failure at the node executing the protocol flow or by restarting the node for maintenance reasons, the latest checkpoint for each protocol flow can be retrieved and restored to resume execution of the protocol flow. The checkpoint service may generate the checkpoints in a manner that is transparent to the protocol flows so that a developer of a protocol flow need not add checkpoint code to a protocol flow.

In some embodiments, the checkpoint service may rewrite a protocol flow prior to execution so that it is resumable, rather than identifying and saving the entire state of the protocol flow as described above. To rewrite a protocol flow, the checkpoint service may employ a Quasar-like tool (see Quasar library by ParallelUniverse) to rewrite the protocol flow. The tool rewrites the classes of computer code to implement a resumable state machine. The tool operates on the bytecodes of the computer code. The result of this rewriting, however, can be illustrated using the following source computer code:

```
fun doFlow( ) {
    Send W to A
    Receive X from A
    Send Y to B
    Receive Z from B
}
```

The result of the rewriting is as follows:

```
fun doFlow(resumeFrom: Integer) throws SuspendExecution {
    switch(resumeFrom) {
        case 0:
            Send W to A
            increment resumeFrom
        case 1:
            Receive X from A, throws SuspendExecution exception if no
                message ready.
            increment resumeFrom
        case 2:
            Send Y to B
            increment resumeFrom
        case 3:
            Receive Z from B, throws SuspendExecution exception if no
                message ready.
            increment resumeFrom
    }
}
```

When the rewritten protocol flow is started, the protocol framework calls "doFlow(0)" to start from the beginning. During each call to the send or receive (message) function of the messaging service, the checkpoint service stores the current value of "resumeFrom," along with other code state such as values of variables. When the protocol flow needs to be restarted, then the protocol framework calls "doFlow (resumeFrom)" to continue from the point of the last checkpoint. The checkpoint service rewrites the "receive" calls so that they "suspend" if there is no message waiting to be received by throwing an exception and thus terminating the "doFlow" function. When a message is received for the protocol flow, the checkpoint service restarts the "doFlow" function passing resumeFrom so that the protocol flow continues at the receive call without having to re-execute the code that was already executed.

In some embodiments, the protocol framework provides a mapping service that maps identities of entities to their corresponding address (e.g., Internet Protocol ("IP") address). The entities may include parties to a transaction, notaries, oracles, and so on. The identity and address of each entity is registered with the mapping service. When a message is to be sent to an entity, the message is provided to the messaging service along with the identity of the entity to which the message is to be sent. The messaging service uses the mapping service to identify from the identity the address of the entity to which the message is to be sent.

In some embodiments, the protocol framework provides a status service through which a protocol flow can report its current status. The status service may provide a status function that can be called by a protocol flow to report its current status. For example, a protocol flow may report that is awaiting a response from a notary. The status service may also provide an interface (e.g., user interface) through which an administrator, another user, or a program can track and/or determine the current status of a protocol flow. For example, if a protocol flow has been waiting for a response from a notary for an unusually long time, an administrator may be notified to investigate because the node on which the notary executes may have failed.

In some embodiments, the protocol framework ensures that contract code executes in a deterministic manner such that the contract code produces the same output state for the same input state so that parties can agree on whether a transaction is valid. Because transaction types are defined using bytecodes (e.g., of a Java virtual machine "JVM"), the execution of the bytecodes should be fully deterministic. Standard virtual machines, such as a JVM, may not be fully deterministic. To ensure that the execution of the bytecodes is deterministic, the protocol framework includes a deterministic virtual machine service that modifies contract code to ensure that it executes deterministically as described below in detail.

In some embodiments, a transaction includes input references, output states, commands, attachments, a timestamp, signatures (e.g., of parties and notary), and a summary. An input reference identifies an output state of a prior transaction that is an input state to this transaction. An input reference may include a hash of the prior transaction and an identifier of the output state of that prior transaction. An output state identifies the output of the transaction, such as the new owner (e.g., of funds or another financial instrument), dollar amount, type of transaction, a reference to contract code, a reference to text of the contract, and so on. A command is an input to the contract code. For example, a command may specify a further refinement of verification of the transaction. A command may also have one or more associated identifications (e.g., public keys) of parties whose signatures are needed as approval for use of the command as an input parameter. An attachment is a file (e.g., a Zip file) that can contain arbitrary content that is accessible to the contract code. A timestamp is a time range in which the transaction is asserted to have occurred. A timestamp may be needed, for example, because of regulatory requirements or as proof of time of payment. The signature of a notary on a transaction indicates that the notary has confirmed that the timestamp is accurate. A summary is a text description that may be displayed to a user approving a transaction as evidence of the content of the transaction.

In some embodiments, a notary service of the distributed ledger system provides transaction ordering and timestamping services in addition to transaction verification and notarizing services. The notary service may be provided by a notary service that decides whether to notarize a transaction or a notary service that interfaces with other mistrusting notary services who use a consensus algorithm such as a Byzantine fault tolerance algorithm or a Raft consensus algorithm to decide whether to notarize a transaction. The notary services receive accepted transactions, verify whether the input states of the transactions have been consumed, and if they have not, sign the accepted transaction. If a network has multiple notaries, then notary services can seamlessly be phased in or out, a notary service can be jurisdiction-specific to comply with jurisdictional regulations, notary services can compete based on availability and performance, and so on.

In some embodiments, the protocol framework supports the scheduling of events. For example, a protocol flow may need to manage expiration of an option contract, to manage a contract default, to re-fix an interest rate swap, and so on. To support the scheduling of events, the contract code of a state (i.e., input or output) may have a scheduling function for providing the next time a protocol flow is to be executed to process the state. When a notarized transaction is recorded, the protocol framework invokes the scheduling function of the state (e.g., output state) of the notarized transaction. The scheduling function returns a time in which a protocol flow is to be next executed. The protocol framework records the time and then starts the protocol flow at the recorded time.

FIG. 1 is a diagram that illustrates an example transaction in some embodiments. A transaction A 103 is proposed to make both a contract payment and an associated insurance payment for the contract. Transaction A specifies the input states of input state A 101 and input state B 102. The input state A specifies that the owner has $2000, and the input state B specifies that the owner has $5000. Transaction A specifies the output states of output state C 104 and output state D 105. The output state C specifies to make a contract payment of $6500, and the output state D specifies to make an insurance payment of $500. State content 106 illustrates example content of a state. To propose transaction A, the proposing (or proposer) party executes a protocol flow for the transaction. The protocol flow generates transaction A, which specifies the input states, the output states, and an identifier of a notary. The output states may identify the accepting (or acceptor) parties for accepting the contract payment and the insurance payment. The protocol flow then signs transaction A with the private key of the proposing party and sends transaction A as a proposed transaction to the accepting parties in sequence. Each accepting party verifies that transaction A has been signed by the proposing party and invokes the contract code of the input states and at least its output state to ensure that the proposed transaction complies with the terms of the contract. Each accepting party then accepts transaction A by signing transaction A with its private key and sends the accepted transaction A to the proposing party. When accepted by all accepting parties, the proposing party submits accepted transaction A to a notary. The notary verifies the signatures of accepted transaction A, timestamps accepted transaction A, ensures that the input states have not yet been consumed, and notarizes the accepted transaction A by signing with the notary's private key to generate a notarized transaction A. The notary then sends the notarized transaction A to the proposing party, who records the notarized transaction A and forwards the notarized transaction A to the accepting parties, who each record the notarized transaction A.

Figure 2:
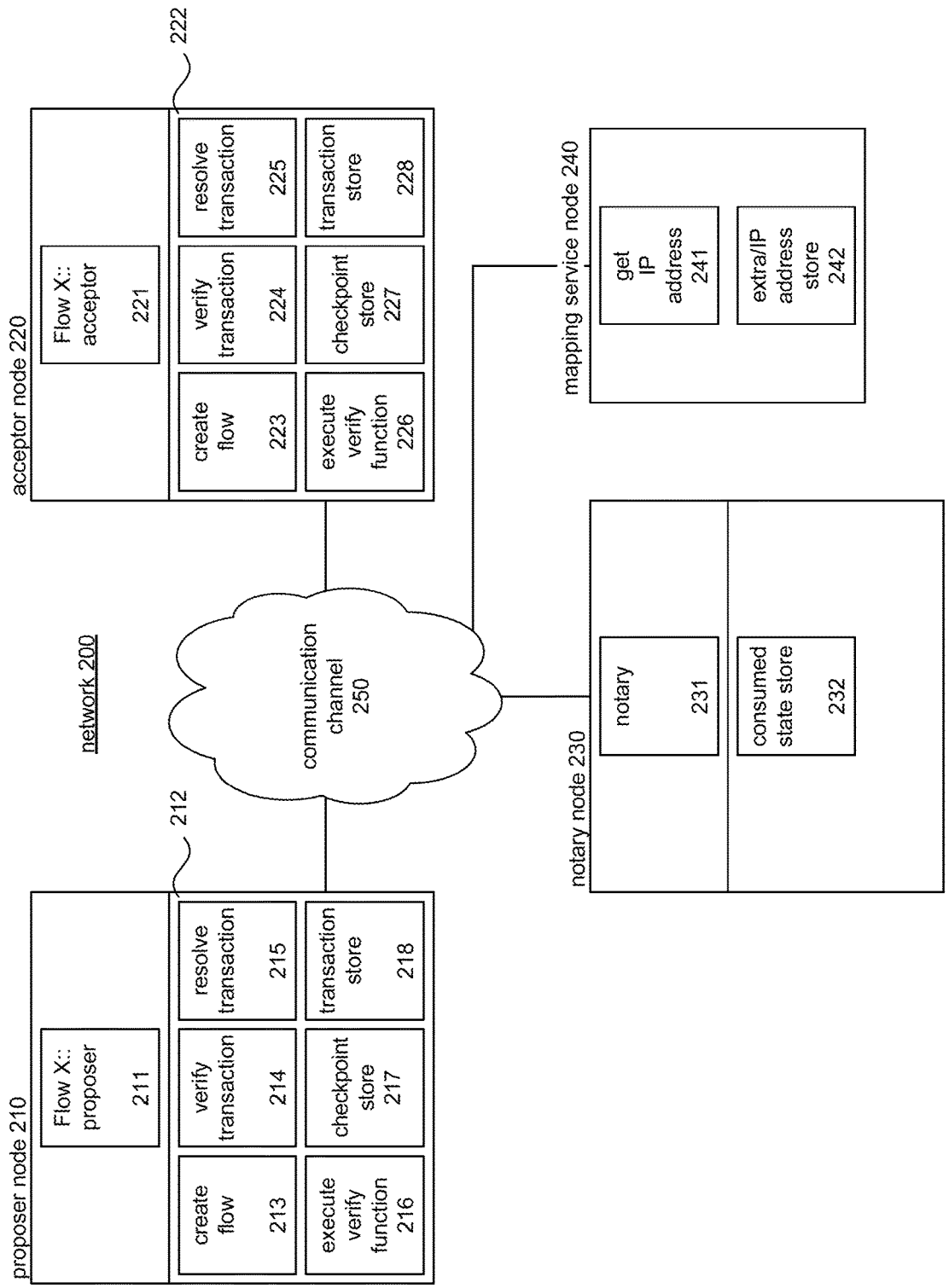
FIG. 2 is a block diagram illustrating components of the distributed ledger system in some embodiments.

FIG. 2 is a block diagram illustrating components of the distributed ledger system in some embodiments. A distributed ledger system may be implemented on nodes of a network 200. Each entity (e.g., party to a contract, notary, mapping service) may have one or more nodes registered with the network. FIG. 2 illustrates that the network includes a proposer node 210, an acceptor node 220, a notary node 230, and a mapping service node 240 that communicate a via communications channel 250. The proposer node includes a protocol flow 211 and protocol framework components 212. The protocol flow 211 may represent the flow for a proposer role of a two-party contract protocol flow. The protocol framework components include a create (or instantiate) flow component 213, a verify transaction component 214, a resolve transaction component 215, an execute verify function component 216, a checkpoint store 217, and a transaction store 218. The create flow component instantiates a protocol flow for execution. The verify transaction component verifies signatures of a proposed transaction, invokes the resolve transaction component to ensure that the input states of the proposed transaction are valid, and invokes the execute verify function to execute the contract code of the input and output states of the proposed transaction to ensure that the proposed transaction complies with the terms of the contract. The checkpoint store component stores checkpoints generated by the checkpoint service (not illustrated) for restarting a protocol flow. The transaction store, which may be referred to as a vault, stores notarized transactions and may store private keys. The protocol framework components may also include a component for providing notarized transactions to the accepting party for verification of input states, a component for sending and receiving messages, and so on, which are not illustrated in FIG. 2. The acceptor node includes a protocol flow 221, which may represent the flow of an acceptor role of the two-party contract protocol flow, and components 223-226 and stores 227-228, which correspond to components 213-216 and stores 217-218 of the originator node. The notary node includes a notary component 231 and a consumed state store 232. The notary component controls verifying the signatures of an accepted transaction, ensuring that the input states are not yet consumed, and notarizing the accepted transaction. The notary component stores an indication of each consumed state in the consumed state store to prevent double-spending of the consumed output state. The input state may be identified by a hash of the transaction that generated the output state that is being used as the input state along with an identifier of which output state of the transaction is being used as the input state. The mapping service node includes a get IP address component 241 and an entity/IP address store 242. The get IP address component receives a request for an IP address that corresponds to a given identity of an entity and returns the IP address of a node assigned to the entity. The entity/IP address stores a mapping of entity identifiers to IP addresses of their nodes.

The computing systems (e.g., nodes) on which the distributed ledger system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the distributed ledger system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The distributed ledger may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the distributed ledger system may be implemented in hardware using, for example, an application-specific integrated circuit (ASIC) or field programmable gate array ("FPGA").

Figure 3:
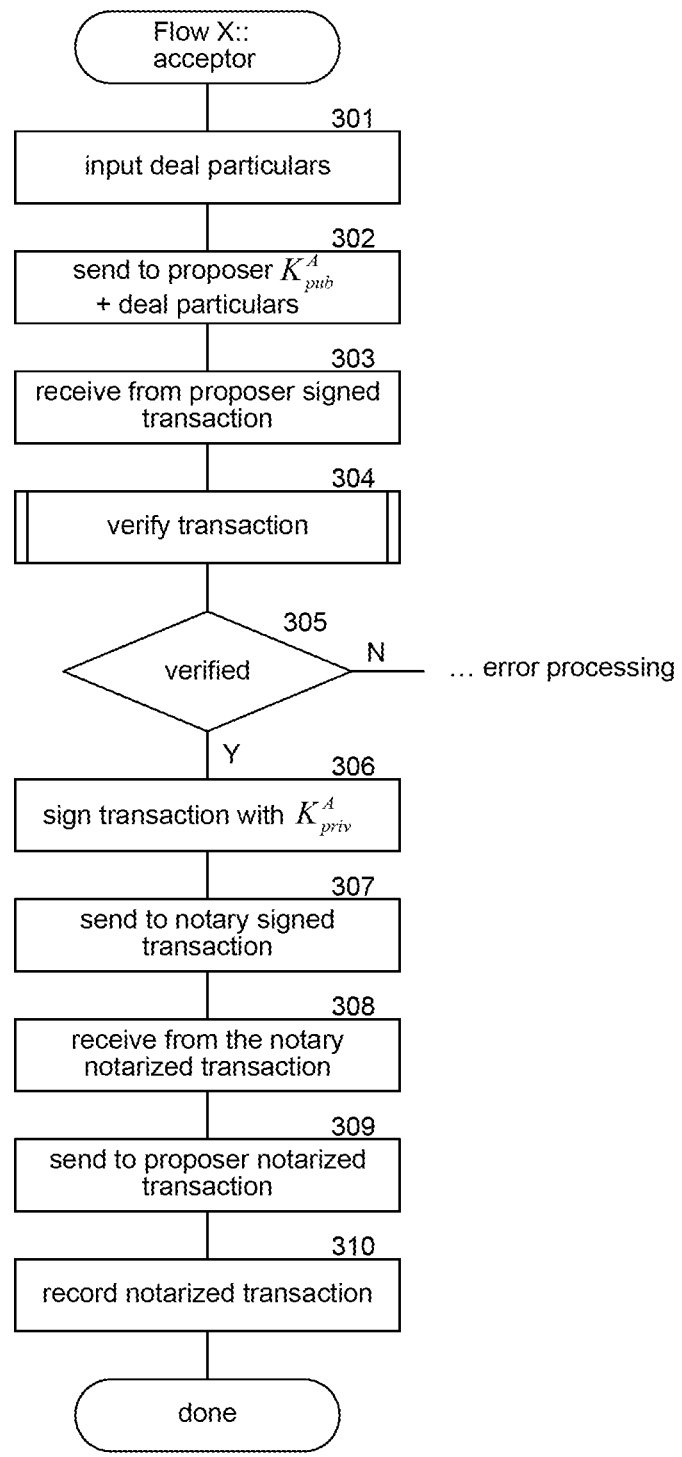
FIG. 3 is a flow diagram illustrating processing of an example flow for the role of an acceptor for a protocol flow in some embodiments.

FIG. 3 is a flow diagram illustrating processing of an example flow for the role of an acceptor for a protocol flow in some embodiments. An acceptor component 300 is executed when an accepting party wants to execute a transaction with a proposing party. The accepting party and the proposing party may agree outside of the distributed ledger system to the terms of the transaction (also referred to as deal particulars). In block 301, the component inputs the deal particulars, such as a dollar amount that is to be transferred between the parties, a notary to use, and so on. In block 302, the component sends to the proposing party the public key (e.g., via a public key certificate) of the accepting party and the deal particulars. In block 303, the component receives from the proposing party a proposed transaction that is signed by the proposing party. In block 304, the component invokes a verify transaction component to verify the proposed transaction, including verifying the signature of the proposing party. In decision block 305, if the proposed transaction has been verified, then the component continues at block 306, else the component performs some error processing such as alerting an administrator. In block 306, the component signs the proposed transaction with the private key of the accepting party to generate an accepted transaction. In block 307, the component sends the accepted transaction to the notary specified in the accepted transaction. In block 308, the component receives from the notary the notarized transaction. In block 309, the component sends to the proposing party the notarized transaction. In block 310, the component records the notarized transaction in the vault of the accepting party. The component then completes.

Figure 4:
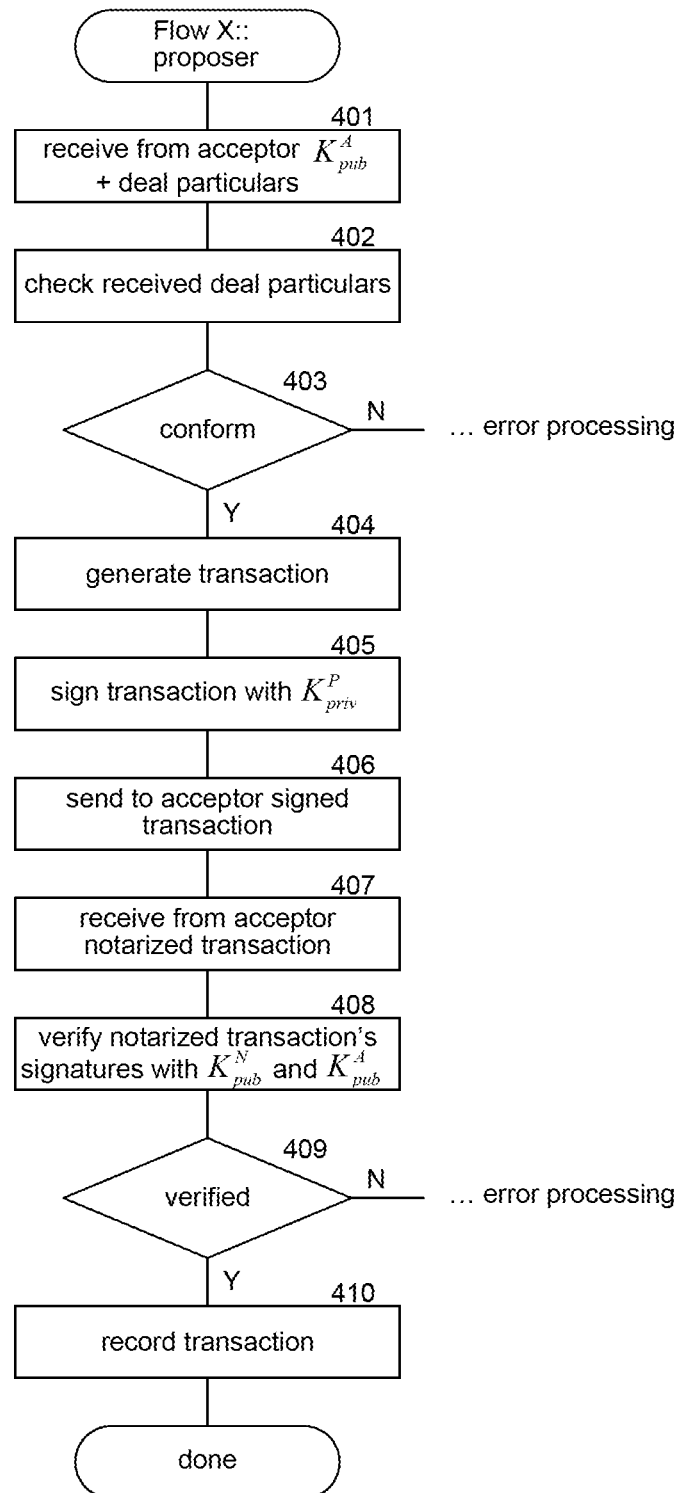
FIG. 4 is a flow diagram that illustrates processing of an example flow for the role of the proposer of the protocol flow of FIG. 3 in some embodiments.

FIG. 4 is a flow diagram that illustrates processing of an example flow for the role of the proposer of the protocol flow of FIG. 3 in some embodiments. A proposer component 400 is executed when a proposing party wants to execute a transaction with an accepting party. The component initially inputs the deal particulars, such as a dollar amount that is to be transferred between the parties, a notary to use, and so on. In block 401, the component receives from the accepting party the public key of the accepting party and an indication of the deal particulars. Alternatively, the component may retrieve the public key from a certificate authority, from a service that stores public keys, or from some other service. In block 402, the component checks the received deal particulars to ensure that they conform with the input deal particulars. In decision block 403, if the deal particulars conform, then the component continues at block 404, else the component performs error processing such as alerting an administrator. In block 404, the component generates a proposed transaction that specifies the input states, the output states, and the identification of the notary. In block 405, the component signs the proposed transaction with the private key of the proposing party. In block 406, the component sends to the accepting party the signed proposed transaction. In block 407, the component receives from the accepting party a notarized transaction. In block 408, the component verifies the notarized transaction by using the public key of the notary and the public key of the accepting party to ensure that the notarized transaction has been signed by the notary and the accepting party. In decision block 409, if the notarized transaction is verified, then the component continues at block 410, else the component performs some error processing such as alerting an administrator. In block 410, the component records the notarized transaction and then completes. Although not illustrated in FIGS. 3 and 4, the components may periodically notify the protocol framework of the status of the protocol flow so that the protocol framework may publish the status so that the status is available to administrators, error processing components, and so on. For example, the proposer component may update the status when it initially starts up, receives the deal particulars, verifies the deal particulars, sends the proposed transaction, receives the notarized transaction, and records the notarized transaction. In addition, the protocol framework, may generate checkpoints whenever a component passes control to the protocol framework, such as when sending or receiving a message, updating the status, and so on.

Figure 5:
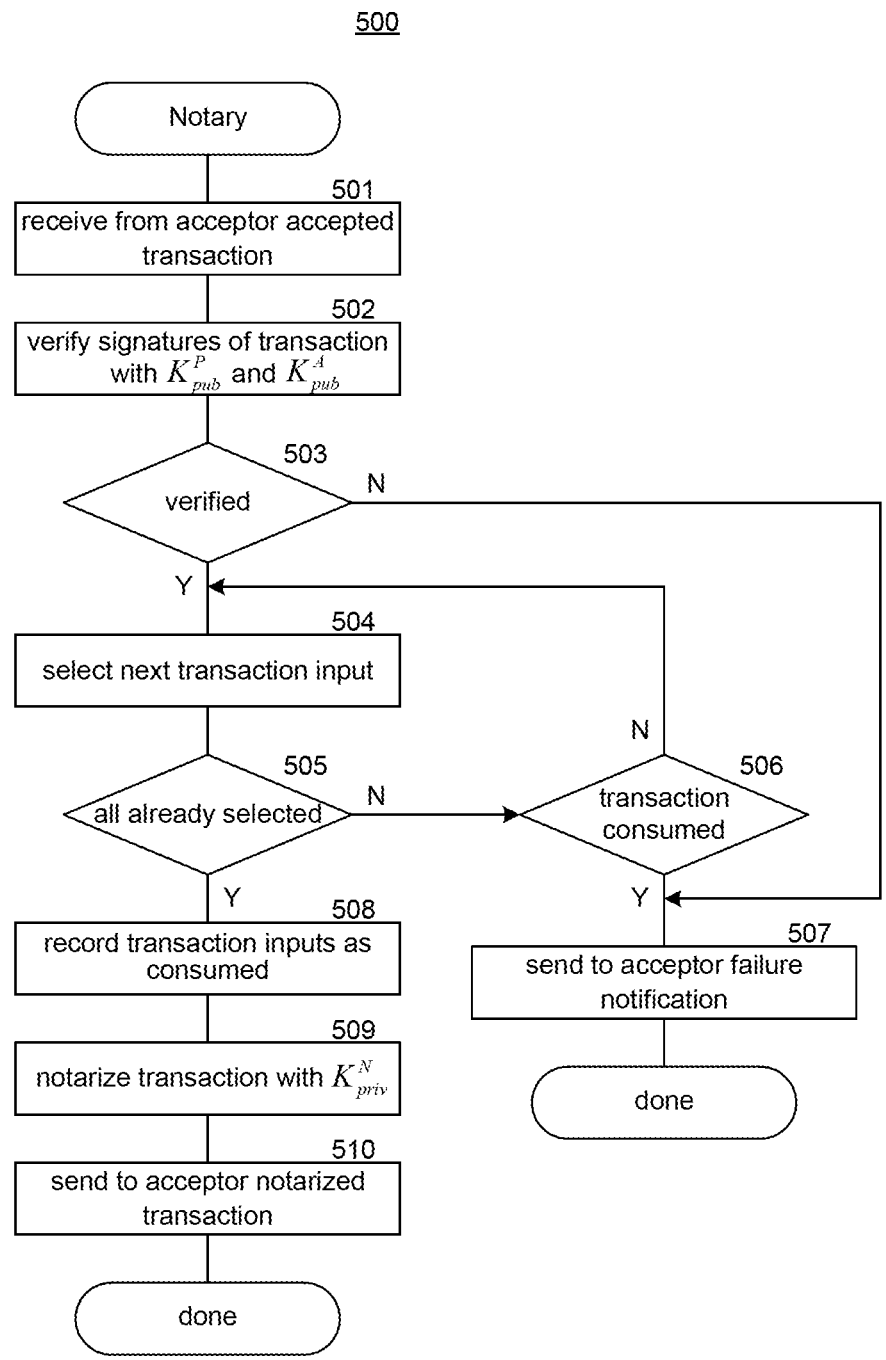
FIG. 5 is a flow diagram that illustrates processing of a notary in some embodiments.

FIG. 5 is a flow diagram that illustrates processing of a notary service in some embodiments. A notary component 500 may be an implementation of a role of a notary for a protocol flow. In block 501, the component receives from the accepting party an accepted transaction that is to be notarized. In block 502, the component verifies the signatures of the accepted transaction using the public keys of the proposing party and the accepting party. In decision block 503, if the signatures are verified, then the component continues at block 504, else the component continues at block 507. In blocks 504-506, the component loops determining whether the input states of the accepted transaction have been consumed. In block 504, the component selects the next input state of the transaction. In decision block 505, if all the input states have already been selected, then none of the input states have been consumed and the component continues at block 508, else the component continues at block 506. In block 506, if the selected input state has been consumed as indicated by the consumed state store, the component continues at block 507, else the component loops to block 504 to select the next input state of the accepted transaction. In block 507, the component sends to the accepting party a failure notification indicating that the transaction cannot be notarized because at least one input state has been consumed and then completes. In some embodiments, the component may also send a notification directly to the proposing party. For example, the proposing party may have registered with the notary service to receive notifications and notarized transactions or the notary flow may automatically send the notifications or notarized transactions to all parties of the transaction. In block 508, the component records the transaction input states as being consumed by updating the consumed transaction store. In block 509, the component notarizes the accepted transaction to generate a notarized transaction by signing it with the private key of the notary. In block 510, the component sends to the accepting party (and optionally to the proposing party) the notarized transaction and then completes.

Figure 6:
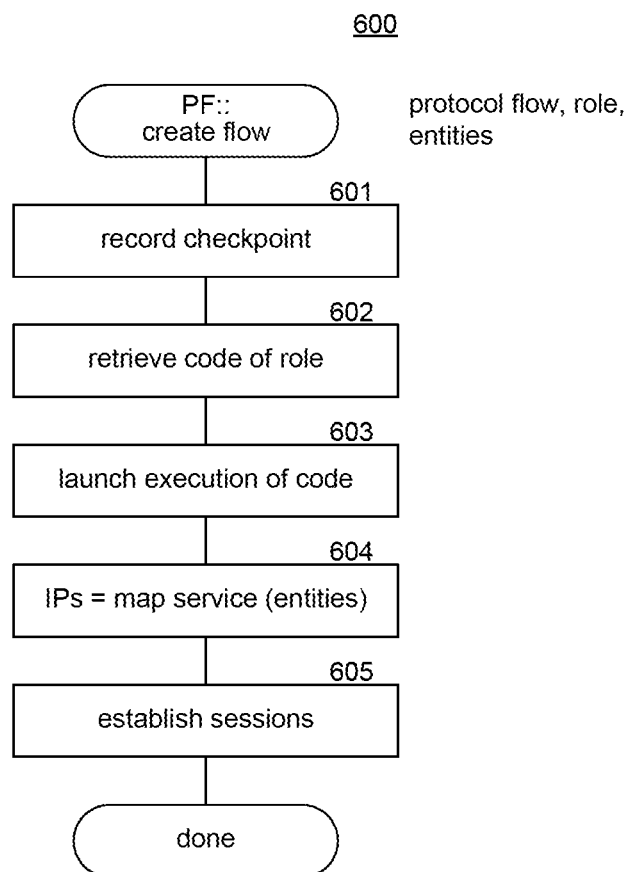
FIG. 6 is a flow diagram that illustrates processing of a create flow component of the protocol framework in some embodiments.

FIG. 6 is a flow diagram that illustrates processing of a create flow component of the protocol framework in some embodiments. A create flow component 600 may be passed an indication of a protocol flow, a role of the protocol flow, and entities involved in the transaction. In block 601, the component may record a checkpoint for the protocol flow. In block 602, the component may retrieve the code for the role of the protocol flow. The component may also rewrite the code to enable it to be resumable if the code has not yet been rewritten. In block 603, the component may launch execution of the code. In block 604, the component may use the mapping service to identify the IP addresses of the entities involved in the protocol flow. In block 605, the component may establish communication sessions with nodes of the entities. Alternatively, the protocol framework may establish the sessions when a protocol flow first sends a message to an entity. The component then completes.

Figure 7:
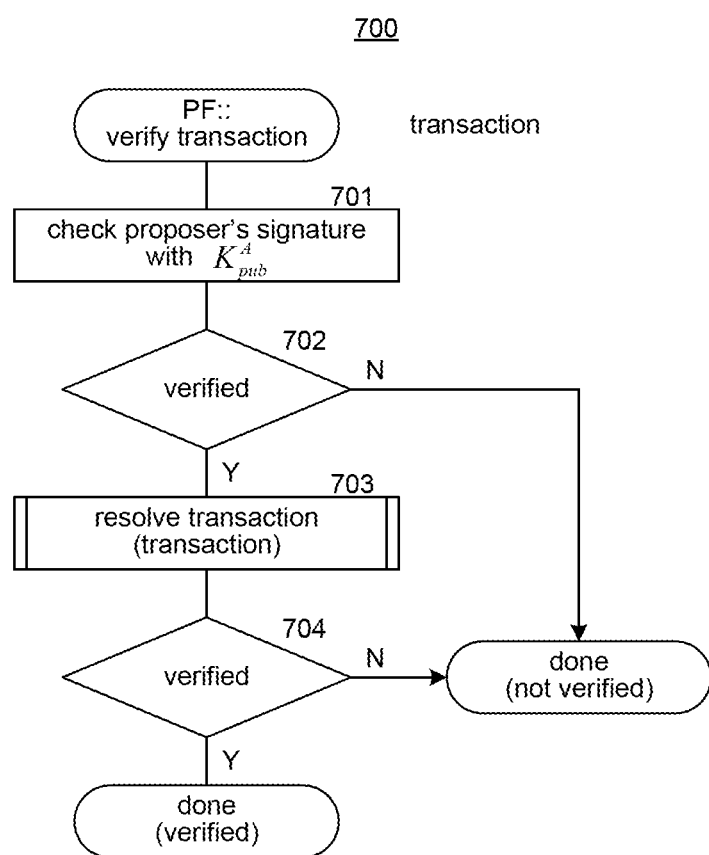
FIG. 7 is a flow diagram that illustrates processing of a verify transaction component of the protocol framework in some embodiments.

FIG. 7 is a flow diagram that illustrates processing of a verify transaction component of the protocol framework in some embodiments. A verify transaction component 700 is invoked by an accepting party to verify the signature of the proposing party and verify that the input states and output states are valid. In block 701, the component uses the public key of the proposing party to check that the proposed transaction has been signed by the proposing party. In decision block 702, if the signature has been verified, then the component continues at block 703, else the component completes and indicates that the proposed transaction is not verified. In block 703, the component invokes a resolve transaction component passing an indication of the proposed transaction to verify whether the contract code of the input states and the output states indicate that the transaction is valid and whether the input states are also from valid transactions. In decision block 704, if the resolve transaction component indicates that the transaction is verified, then the component completes and indicates that the proposed transaction is verified, else the component completes and indicates that the proposed transaction is not verified.

Figure 8:
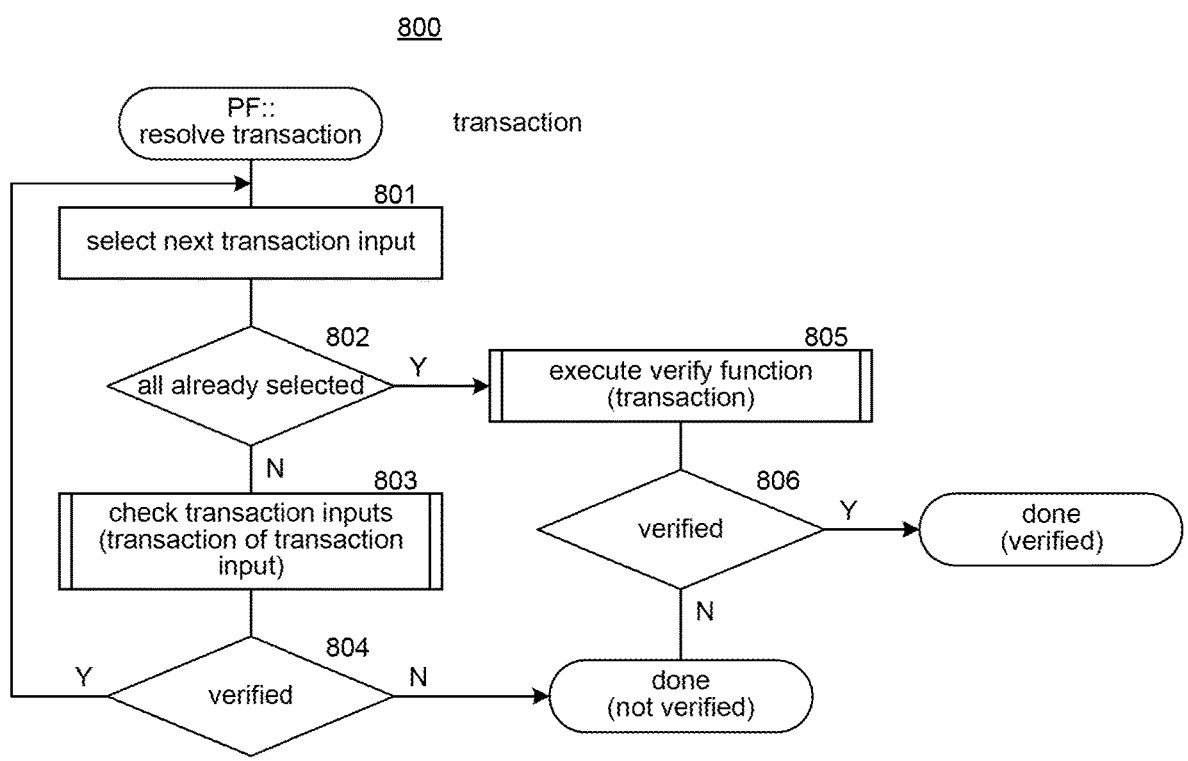
FIG. 8 is a flow diagram that illustrates processing of a resolve transaction component of the protocol framework in some embodiments.

FIG. 8 is a flow diagram that illustrates processing of a resolve transaction component of the protocol framework in some embodiments. A resolve transaction component 800 verifies that the input states to the proposed transaction are output states of valid transactions and that the contract code of the input states and the output states of the proposed transaction indicate that the proposed transaction is valid. In blocks 801-804, the component loops checking the validity of each input state. In block 801, the component selects the next input state of the proposed transaction. In decision block 802, if all the input states have already been selected, then all the input states are valid and the component continues at block 805, else the component continues at block 803. In block 803, the component recursively invokes the check transaction inputs component passing an indication of the transaction of the selected input state. In decision block 804, if the input state has been verified as being valid, then the component loops to block 801 to select the next input state, else the component completes and indicates that the proposed transaction is not verified. In block 805, the component invokes an execute verify function of the protocol framework to invoke the contract code of the proposed transaction to determine whether the proposed transaction complies with the terms of the contract. In decision block 806, if the proposed transaction is verified, then the component completes and indicates that the proposed transaction is verified, else the component completes and indicates that the proposed transaction is not verified.

Figure 9:
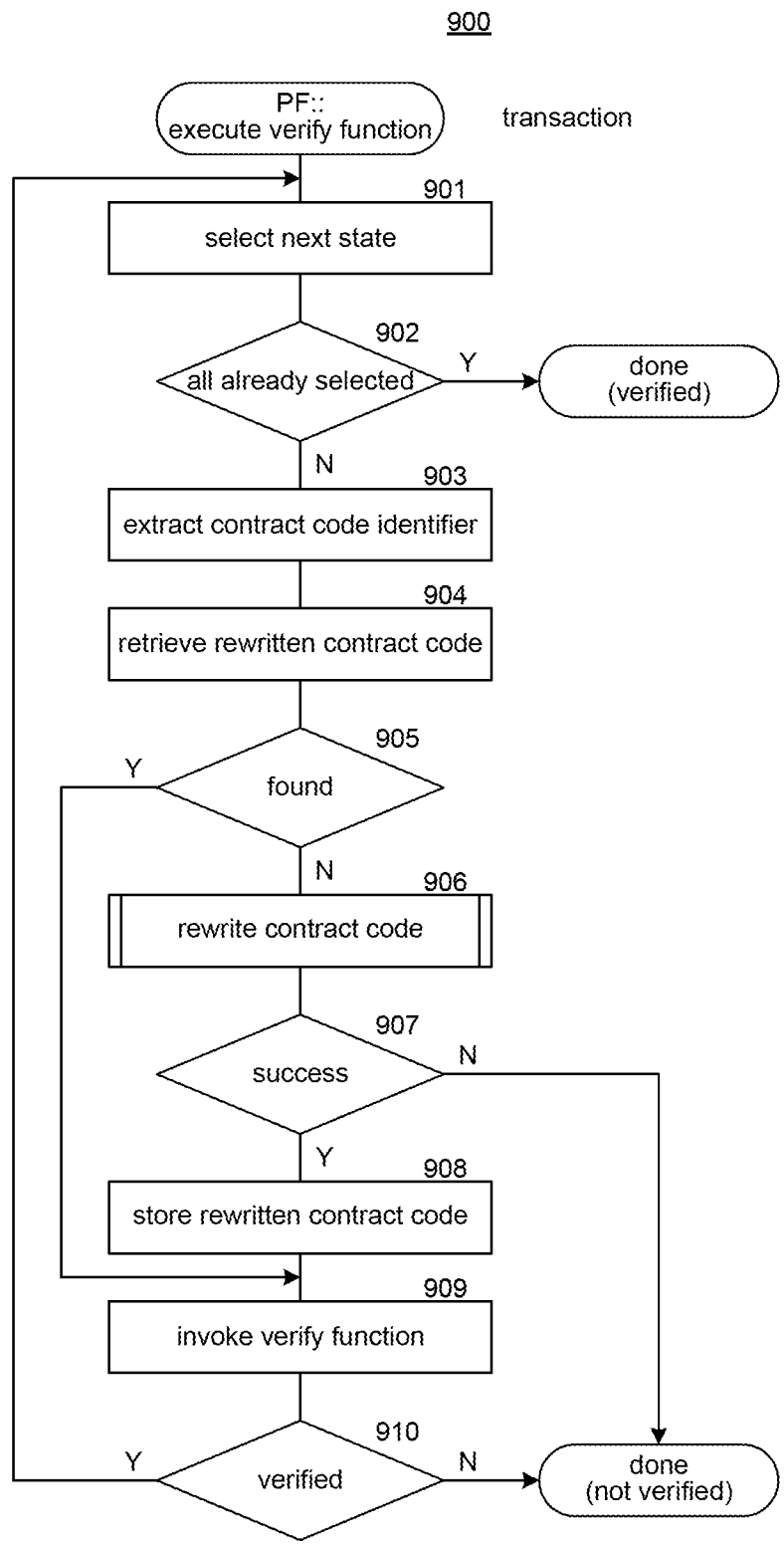
FIG. 9 is a flow diagram that illustrates processing of an execute verify function component of the framework protocol in some embodiments.

FIG. 9 is a flow diagram that illustrates processing of an execute verify function component of the protocol framework in some embodiments. An execute verify function component 900 is invoked to execute contract code associated with the input states and output states of a transaction to determine whether the transaction is valid. The component is responsible for rewriting contract code so that it can be executed deterministically, which is described below in more detail. In block 901, the component selects an input state or output state that has not yet been selected. In decision block 902, if all the input states and output states have already been selected, then the component completes and indicates that the proposed transaction is verified, else the component continues at block 903. In block 903, the component extracts an identifier of the contract code from the selected state of the proposed transaction. In block 904, the component accesses storage to retrieve the contract code if it has already been rewritten. In decision block 905, if the rewritten contract code is found, then the component continues at block 909, else the component continues at block 906. In block 906, the component invokes a rewrite contract code component to rewrite the contract code so that it executes deterministically. In decision block 907, if the rewriting of the contract code was successful, then the component continues at block 908, else the component completes and indicates that the transaction is not verified. In block 908, the component stores the rewritten contract code in the storage for later retrieval to avoid having to rewrite the contract code again. In block 909, the component invokes the verify function of the contract code. The contract code is executed by a virtual machine such as JVM that may be adapted to support deterministic execution of the contract code. In decision block 910, if the verify function verifies that the transaction is valid, then the component loops to block 901 to select another input state or output state, else the component completes and indicates that the proposed transaction is not verified.

Figure 10:
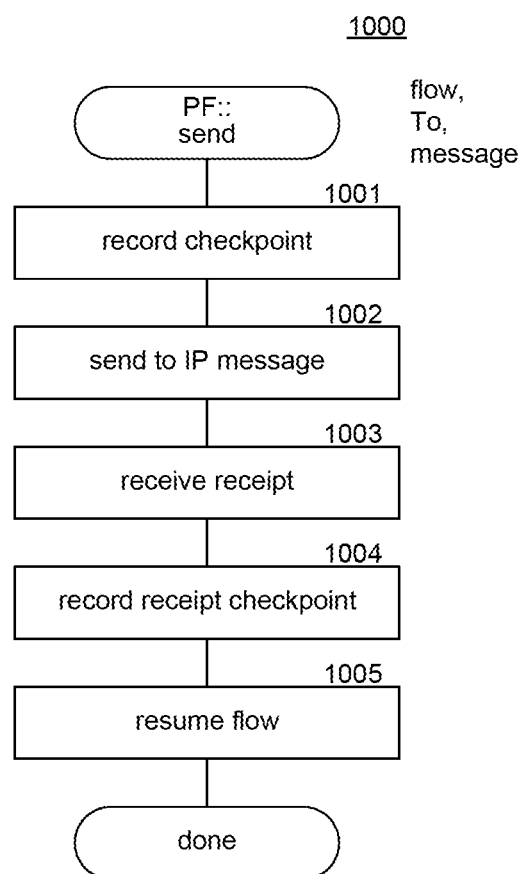
FIG. 10 is a flow diagram illustrating processing of a send message component of the protocol framework in some embodiments.

FIG. 10 is a flow diagram illustrating processing of a send message component of the protocol framework in some embodiments. A send message component 1000 is invoked by a source flow to send a message from the source flow to a target flow executing at nodes in the network. In block 1001, the component suspends execution of the source flow and records a checkpoint for the source flow. In block 1002, the component sends to the IP address of the target flow the message. In block 1003, the component receives a receipt from the target flow (or the protocol framework supporting the target flow) as confirmation that the message was received. In block 1004, the component records a checkpoint indicating that the receipt has been received. In block 1005, the component resumes execution of the source flow and then completes.

Figure 11:
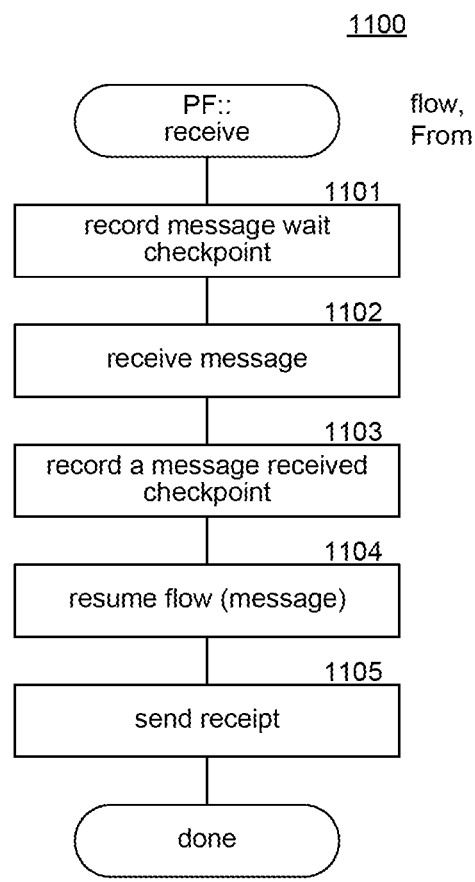
FIG. 11 is a flow diagram that illustrates processing of a receive message component of the protocol framework in some embodiments.

FIG. 11 is a flow diagram that illustrates processing of a receive message component of the protocol framework in some embodiments. A receive message component 1100 is invoked by a target flow to receive a message sent from a source flow. In block 1101, the component suspends execution of the target flow and records a checkpoint for the target flow. In block 1002, the component receives a message from the source flow. In block 1103, the component records a message received checkpoint for the target flow. In block 1104, the component resumes execution of the target flow passing the message to the target flow. In block 1105, the component sends to the source flow a receipt confirming that the message was received and then completes.

Description of Deterministic JVM

The distributed ledger system helps ensure that all nodes that process a transaction agree on whether it is valid or not. Because transaction types are defined using bytecodes (e.g., of a JVM), the execution of the bytecodes should be fully deterministic. Standard virtual machines, such as a JVM, may not be fully deterministic. To ensure that the execution of the bytecodes is deterministic, the protocol framework includes a rewrite contract code component that modifies contract code to ensure that it executes deterministically. Table 1 illustrates example possible sources of non-determinism.

TABLE 1

Sources of external input (e.g., the file system, network, system properties, and clocks)
Random number generators
Different decisions about when to terminate long running programs
Object.hashCode( )
Differences in hardware floating point arithmetic operations
Multi-threading
Differences in API implementations between nodes
Garbage collector callbacks To ensure that contract code is fully pure (i.e., deterministic and with no side effects), the distributed ledger system employs a new type of JVM sandbox. The distributed ledger system may rewrite the bytecode based on a static analysis of the bytecode and modify the JVM to control the behavior of hash code generation and invocation if non-deterministic functions. The rewrite contract code component may rewrite the bytecode of a contract code before it is first executed and store the rewritten bytecode for future executions. Table 2 illustrates example tasks performed during the rewriting of the bytecode.

TABLE 2

Inserts calls to an accounting object before expensive bytecodes
Prevents exception handlers from catching certain exceptions (e.g., Throwable, Error, or ThreadDeath)
Adjusts constant pool references to relink the code against a "shadow" runtime library (e.g., JDK)
Directs the use of hardware independent floating point operations
Forbids dynamic invocation (e.g., invokedynamic bytecodes), native methods, and finalizers The rewrite contract code component instruments the contract code by inserting calls to an accounting object to deterministically terminate code that has run for an unacceptable amount of time or used an unacceptable amount of memory. The accounting object checks a termination criterion to determine whether to terminate the execution of the contract code. For example, the accounting object may determine an accumulated cost of execution (e.g., based on number and types of bytecodes executed and memory used). The termination criterion may specify that execution of the contract code should terminate when an accumulated cost threshold is reached. Because execution of the contract code is deterministic, given the same input, every execution of the contract code will terminate at the same point that is when the termination criterion is satisfied or when execution terminates normally. Particularly, expensive bytecodes may include method invocation, allocations, backwards jumps, throwing of exceptions, and so on. The rewrite contract code also instruments code that can be transitively reached from the contract code. For example, the shadow runtime library may be instrumented prior to execution of any contract code.

The rewrite contract code component may assess the cost of execution by counting bytecodes that are known to be expensive to execute. Since the size of a method is limited and jumps count towards the cost, the assessment of cost will eventually terminate. However, it is still possible to construct bytecode sequences that take excessive amounts of time to execute even though they do not use expensive operations. For example, contract code with very nested method calls in which the most-nested methods perform inexpensive bytecodes may accumulate to be expensive. The instrumentation of the contract code ensures that infinite loops are terminated and that if the cost of verifying a transaction becomes unexpectedly large (e.g., contains algorithms with complexity exponential in transaction size), all nodes agree precisely on when to terminate. The instrumentation may not provide protection against denial of service attacks. If a node receives transactions that appear designed to simply waste CPU time of the node, then the node can block the sending node.

In some embodiments, because instrumentation may be a high overhead, the rewrite contract code component may statically calculate bytecode costs as much as possible ahead of time and instrument only the entry point of "accounting blocks" such as runs of basic blocks that end with either a method return or a backwards jump. Because only an abstract cost (e.g., a general sense of the magnitude of the cost) matters and because the limits are expected to be set relatively high, the rewrite contract code component not need instrument every basic block. For example, the rewrite contract code component may use the maximum of the cost of the "then" block and the cost of the "else" block of an if-then-else statement when neither block contains a backwards jump. In such a case, the rewrite contract code need only instrument before the if-then-else statement and need not instrument the blocks.

The shadow runtime library duplicates a subset of the standard runtime library, but inside a dedicated sandbox package. The shadow runtime library may omit functionality that contract code is not permitted to access such as file I/O or external entropy (e.g., such as a random number generator).

In some embodiments, the rewrite contract code component may direct the use of hardware independent floating-point operations by setting the strictfp flag on every method of the contract code and of code that is transitively called.

In some embodiments, the rewrite contract code component may prohibit finalizers in contract code because finalizers have been known to be implemented non-deterministically. The rewrite contract code component may prohibit calls via a Java Native Interface as the called application may behave non-deterministically. The rewrite contract code component may prohibit the invokeddynamic bytecode because libraries supporting the invokeddynamic bytecode has been known to have security problems.

In some embodiments, the JVM sandbox may impose a quota on bytes allocated rather than bytes retained. If contract code allocates and quickly deallocates large numbers of bytes (resulting in a small heap size), a quota based on bytes allocated may unnecessarily penalize such contract code. Alternatively, the JVM sandbox may employ a garbage collector to identify the heap size and impose a quota based on heap size.

The Object.hashcode( ) is typically implemented either by returning a pointer address or by assigning the object a random number and thus can result in different iteration orders over hash maps and hash sets. To prevent this non-deterministic behavior, the distributed ledger system may modify calls to the Object.hashCode( ) function with new Java Native Interface ("JNI") calls that reseeds the JVM's thread local random number generator before execution begins. The seed may be derived from the hash of the transaction being verified to ensure that all verifications of the transaction use the same seed and thus the same hash code.

Figure 12:
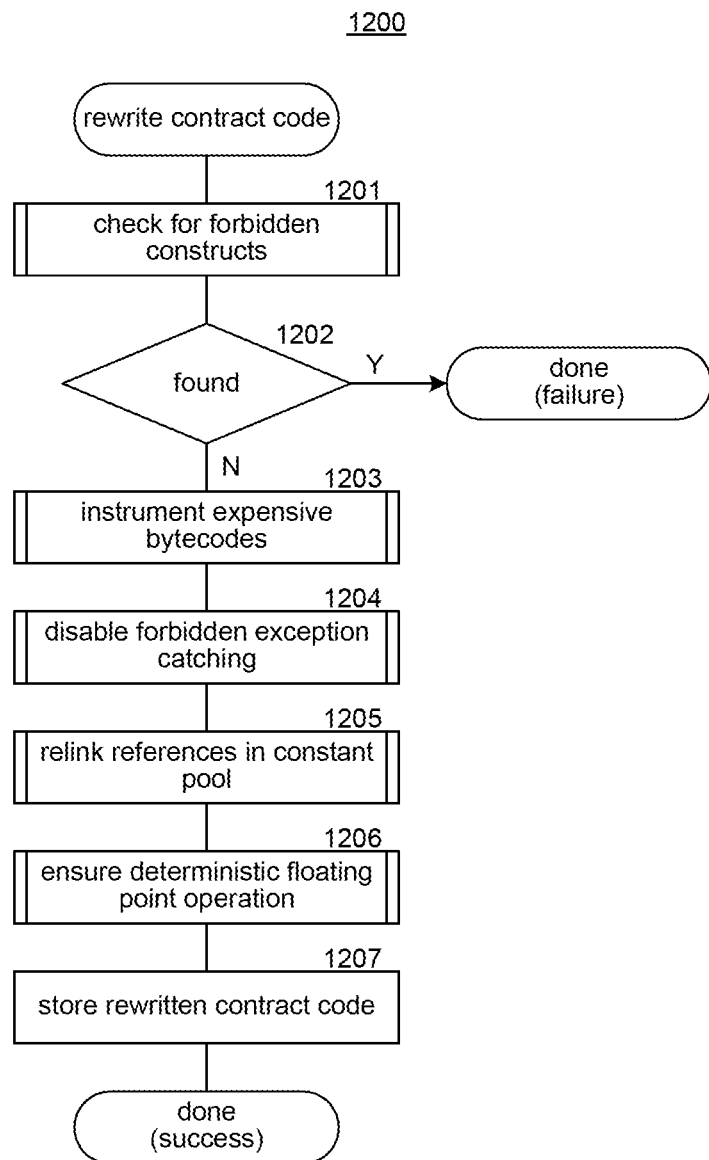
FIG. 12 is a flow diagram that illustrates processing of a rewrite contract code component in some embodiments.

FIG. 12 is a flow diagram that illustrates processing of a rewrite contract code component in some embodiments. A rewrite contract code component 1200 is invoked when contract code is first executed to rewrite the contract code so that it operates deterministically. In block 1201, the component invokes a check for forbidden constructs component to determine whether the contract code includes any forbidden constructs. In decision block 1202, if a forbidden construct is found, then the component completes indicating a failure to rewrite the contract code, else the component continues at block 1203. In block 1203, the component invokes an instrument expensive bytecodes component to instrument bytecodes that are expensive to execute. In block 1204, the component invokes a disable forbidden exception catching component to disable the catching of certain exceptions. In block 1205, the component invokes a relink references in constant pool component to relink references from the runtime library to the shadow runtime library. In block 1206, the component invokes an ensure deterministic floating point operation component to direct that floating-point operations are hardware independent. In block 1207, the component stores the rewritten contract code for subsequent execution and then completes indicating success.

Figure 13:
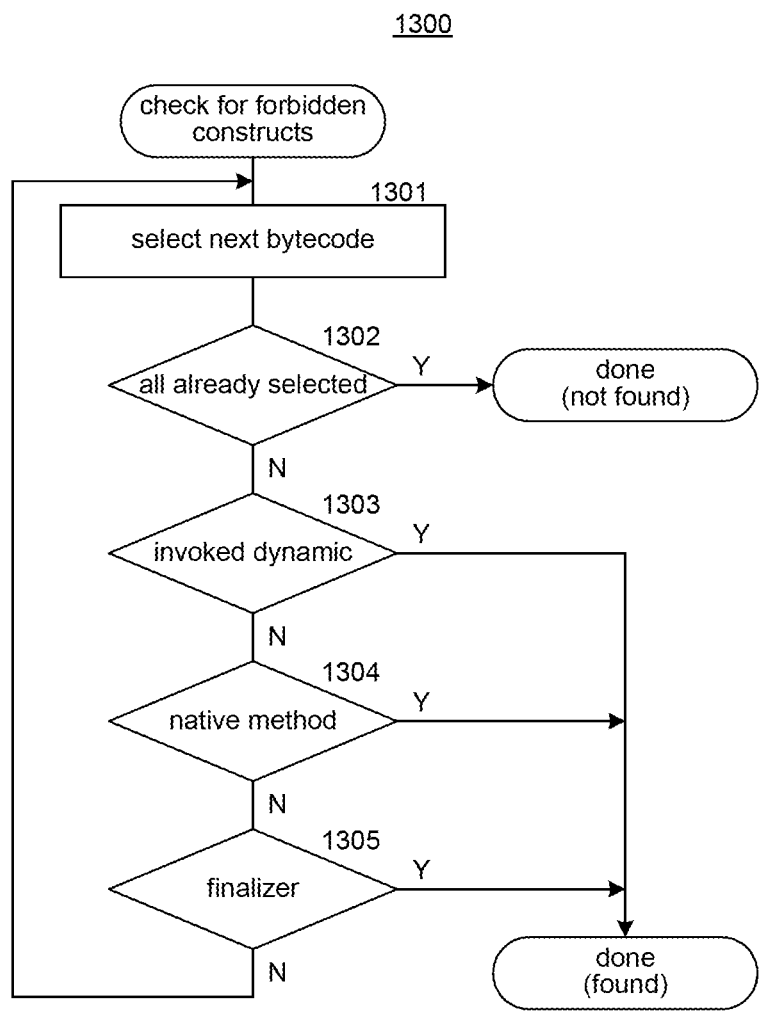
FIG. 13 is a flow diagram that illustrates processing of a check for forbidden constructs component in some embodiments.

FIG. 13 is a flow diagram that illustrates processing of a check for forbidden constructs component in some embodiments. A check for forbidden constructs component 1300 is invoked to ensure that contract code is not executed that includes forbidden constructs. In block 1301, the component selects the next bytecode of the contract code starting with the first. In decision block 1302, if all the bytecodes have already been selected, then the component completes returning an indication that forbidden constructs were not found, else the component continues at block 1303. In decision blocks 1303-1305, the component determines whether the bytecode is a forbidden construct. If so, the component completes indicating that a forbidden construct was found. If not, the component loops to block 1301 to select the next bytecode of the contract code.

Figure 14:
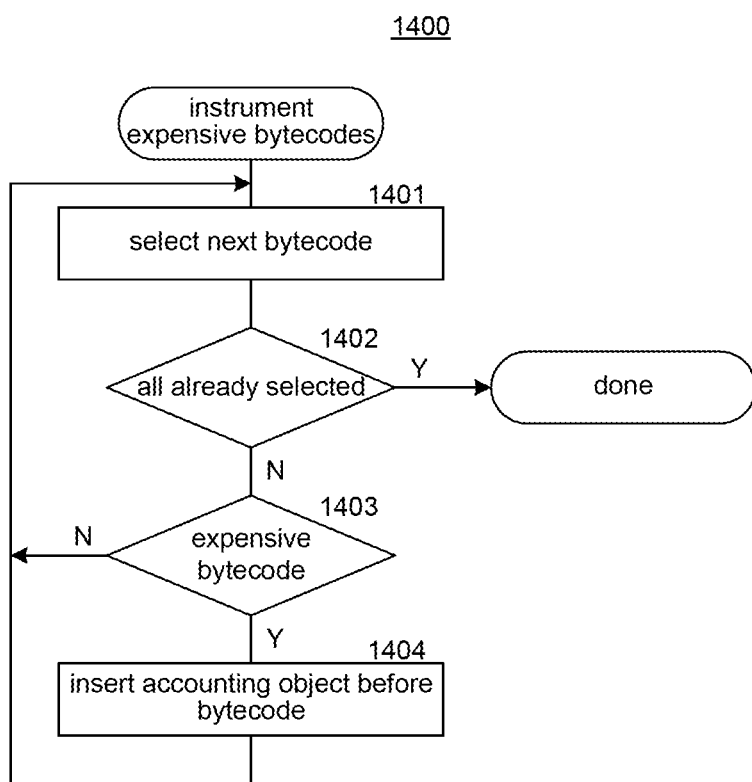
FIG. 14 is a flow diagram that illustrates processing of an instrument expensive bytecodes component in some embodiments.

FIG. 14 is a flow diagram that illustrates processing of an instrument expensive bytecodes component in some embodiments. An instrument expensive bytecodes component 1400 is invoked to determine whether bytecodes are expensive to instrument and if so, adds an accounting object before each such bytecode. The accounting object is responsible for terminating execution of the contract code if execution is taking too long or consuming too much memory. In a block 1401, the component selects the next bytecode of the contract code starting with the first. In decision block 1402, if all bytecodes have already been selected, then the component completes, else the component continues at block 1403. In decision block 1403, if the selected bytecode is expensive, then the component continues at block 1404, else the component loops to block 1402 to select the next bytecode. In block 1404, the component inserts an accounting object before the selected bytecode and then loops to block 1401 to select the next bytecode.

Figure 15:
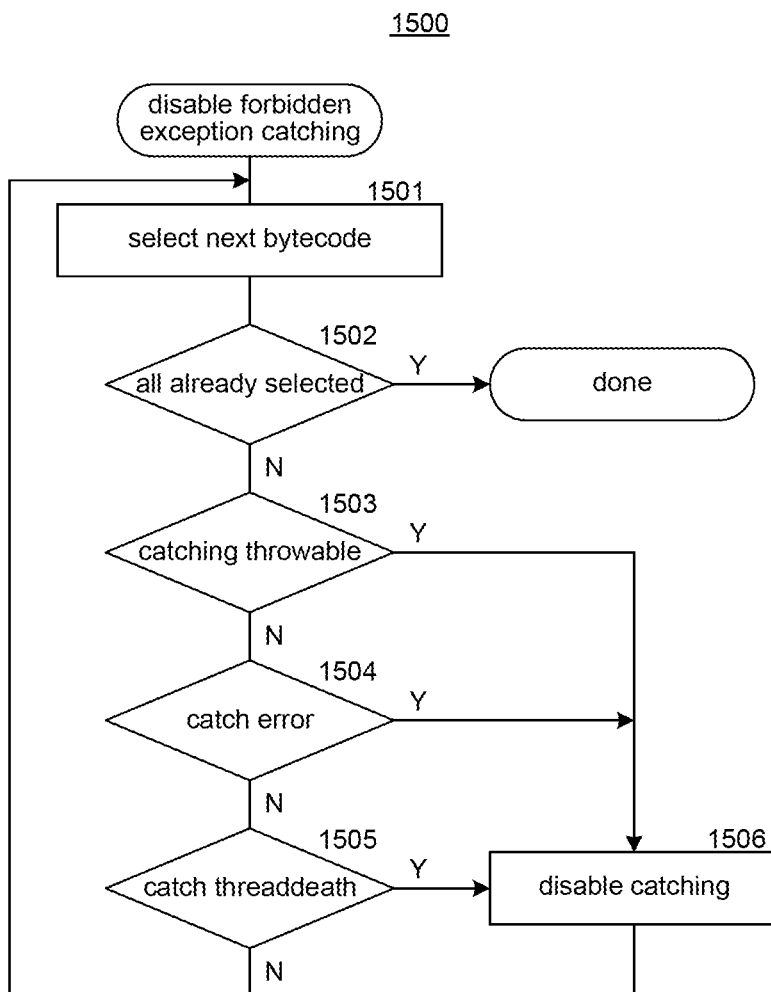
FIG. 15 is a flow diagram that illustrates processing of a disabled forbidden exception catching component in some embodiments.

FIG. 15 is a flow diagram that illustrates processing of a disable forbidden exception catching component in some embodiments. A disable forbidden exception catching component 1500 is invoked to ensure that the contract code does not catch certain exceptions. For example, an accounting object may want to terminate the thread on which the contract code is executing as a result of the contract code using an excessive amount of computational resources. In such a case, the accounting object may direct that an exception be thrown, which should not be handled by the contract code. In block 1501, the component selects the next bytecode of the contract code starting with the first. In decision block 1502, if all the bytecodes have already been selected, then the component returns, else the component continues at block 1503. In decision blocks 1503-1505, the component determines whether the bytecode represents the catching of a forbidden exception. If so, in block 1506, the component disables the catching of the exception and then loops to block 1501 to select the next bytecode. If not, the component loops to block 1501 to select the next bytecode.

Figure 16:
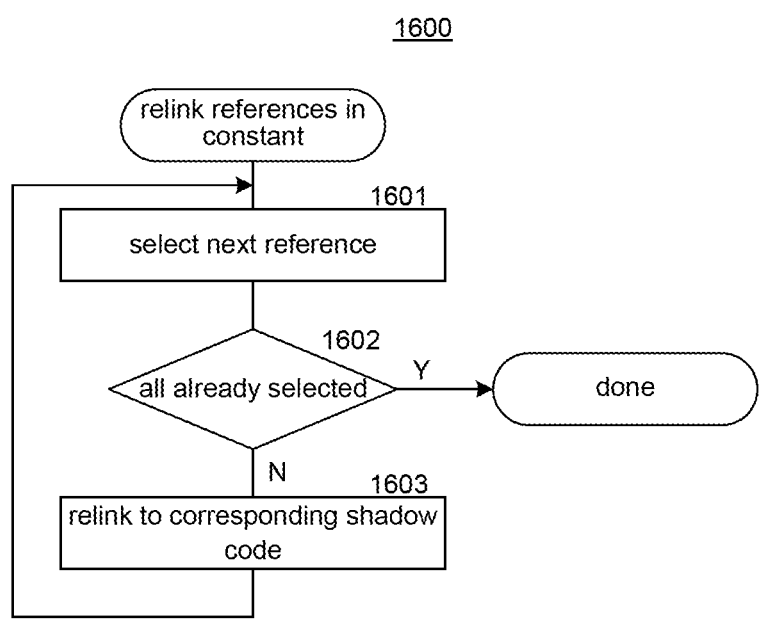
FIG. 16 is a flow diagram that illustrates processing of a relink references in constant pool component in some embodiments.

FIG. 16 is a flow diagram that illustrates processing of a relink references in constant pool component in some embodiments. A relink references constant pool component 1600 is invoked to relink the references to the shadow runtime library. In block 1601, the component selects the next reference in the constant pool. In decision block 1601, if all the references have already been selected, then the component completes, else the component continues at block 1603. In block 1603, the component relinks the reference to the corresponding shadow code in the shadow runtime library and then loops to block 1601 to select the next reference.

Figure 17:
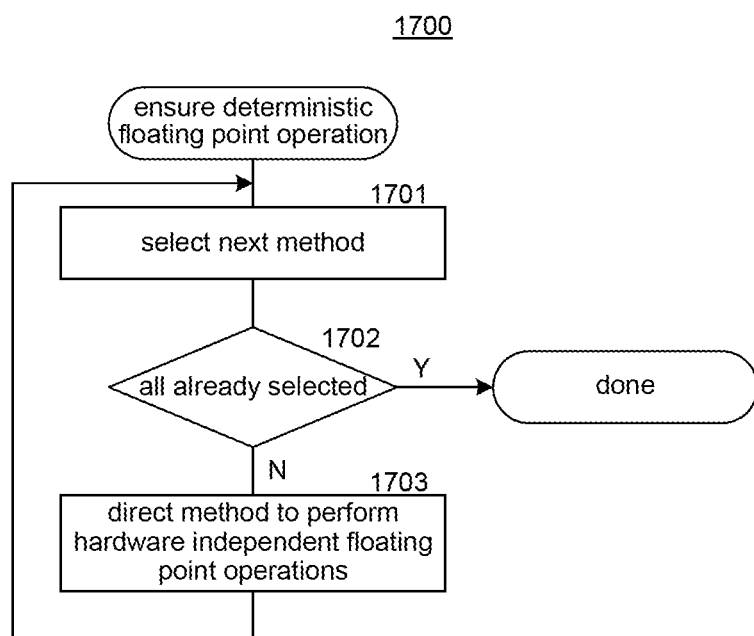
FIG. 17 is a flow diagram that illustrates processing of an ensure deterministic floating point operation component in some embodiments.

FIG. 17 is a flow diagram that illustrates processing of an ensure deterministic floating-point operation component in some embodiments. An ensure deterministic floating-point operations 1700 is invoked to direct each method to use hardware independent floating-point operations. In block 1701, the component selects the next method of the contract code. In decision block 1702, if all the methods have already been selected, then the component completes, else the component continues at block 1703. In block 1703, the component directs the method to perform hardware independent floating-point operations such as by setting the strictfp flag of a Java method and then loops to block 1701 to select the next method of the contract code.

Description of Secure Signing Devices

In some embodiments, the distributed ledger system may employ secure signing devices that provide secure client-side hardware to hold private keys and to perform signing operations with the private keys. The distributed ledger system may employ advance devices like the TREZOR by Satoshi Labs or the Ledger Blue. These devices are improvements over Chip Authentication Program ("CAP") readers in that they have better displays and transmit responses electronically (e.g., USB, NFC, or Bluetooth), rather than by a person manually copying and typing in the response. These devices differ from CAP readers in another key respect: instead of signing arbitrary, small challenge numbers, they understand the native transaction format of the network for which they are specialized and parse a transaction to determine what message to display to the user, who then confirms that they wish to perform the displayed action by simply pressing a button. The device then signs the transaction before sending the signed transaction to the computer (e.g., personal computer) that sent the transaction to the device.

The use of such advanced devices enables a device to control the assets that are recorded at a server. The private key can also be exported from the device by writing it down in the form of "wallet words:" 12 random words derived from the contents of the elliptical curve private key. Because elliptic curve private keys are small (256 bits), this is not as tedious as it would be with the much larger RSA keys that are typically used by the financial industry. Because the signing keys are personal, an employee of an organization with a signing key is responsible for signing transactions, rather than having a node of the organization be responsible for signing transactions. Thus, if an organization node is hacked by a malicious intruder or bad insider, the hacker cannot steal assets, modify agreements, or do anything else that requires human approval, because the hacker does not have access to the signing keys. In addition, it is indisputable who signed a particular transaction. The indisputability is especially true if the device provides for biometric authentication (e.g., fingerprint or retinal scan) of the user.

A difficulty with such advanced devices (and CAP readers) is that they are susceptible to confusion attacks. A confusion attack may occur when a hacker modifies a transaction, for example, to replace the account number of the intended recipient with the account number of the hacker. When the user sees the account number on the device, the user may not realize that the account number is wrong and sign the transaction. To help prevent confusion attacks, the distributed ledger system allows a transaction to include a transaction summary in addition to the input states, the output states, the contract code, the commands, and so on. The contract code is responsible for generating a message from the text of the transaction summary. When the transaction is downloaded to the device for signing, the contract code is invoked to generate the message to be displayed to the user. Because the downloaded transaction is signed (i.e., by encrypting a hash of the transaction and encrypting the hash with a private key), the authenticity of the transaction and the message can be confirmed by the user.

In some embodiments, it may not be desirable to download an entire transaction to a device. For example, the device may have a relatively small amount of storage that would place an undesirable limitation on the maximum size of a transaction. The distributed ledger system may support representing the hash of a transaction as a Merkle tree with the root node corresponding to the hash of the transaction, each non-leaf node corresponding to a hash of its children, and each leaf node corresponding to a hash of a part of the transaction such as a transaction summary, each input state and output state, attachments, and commands. With a Merkle tree representation of a transaction, the distributed ledger system need only provide the device with the nodes (and each node's sibling nodes) along the path from the root node to node of the hash of the transaction summary. The device can then generate a hash of the transaction summary and confirm that the hash was used to generate a hash of the root node. A signed hash of the transaction may also be provided to the device so that the device can ensure that the party that signed the hash attests to the authenticity of the hash. In this way, the device can be assured that the transaction summary is from the transaction represented by the hash of the root node. Thus, when the user signs off on the transaction after the transaction summary is displayed, the device can sign the hash of the transaction (i.e., the hash of the root node) and provide the signed hash to the computer as the signature of the user.

A Merkle tree representation may be useful to provide only certain parts of a transaction to other entities. For example, an oracle may need to confirm a term of a contract such as an interest rate. In such a case, the nodes (and their sibling nodes) of the Merkle tree from the root node to the leaf node with the hash of the interest rate node can be provided to the oracle. The oracle, in a similar manner to that of a secure device, can check the hashes and sign off on the transaction. A Merkle tree representation may also allow entities to sign off on portions of a transaction rather than on an entire transaction. For example, an oracle may only need to sign the hash of the interest rate node to make it clear that the oracle is attesting to only the authenticity of the interest rate.

The following paragraphs describe various embodiments of aspects of the distributed ledger system. An implementation of the distributed ledger system may employ any combination of the embodiments. The processing of the methods described below may be performed by a computing device with a processor that executes computer-executable instructions stored on a computer-readable storage medium that implements the distributed ledger system.

In some embodiments, a distributed ledger system provides a method performed by a computing system for coordinating a transaction between parties. The method proposes a transaction between a first party and a second party by generating a proposed transaction that specifies a state that includes at least one of an input state and an output state (but may include zero or more input states and outputs), and specifies an identifier of a notary. The state has contract code for verifying that the proposed transaction complies with terms of a contract. The method also signs the proposed transaction with a signature of the first party sends the proposed transaction to the second party. The method then receives an accepted transaction that indicates acceptance of the proposed by the second party. The method verifies that the notarized transaction has been accepted by the second party and has been notarized by ensuring the accepted transaction matches the proposed transaction and that the notarized transaction has been signed by the second party and the notary. The method then records the notarized transaction in a decentralized storage so that the notarized transaction is accessible by the first party. In some embodiments, the decentralized storage allows notarized transactions to be recorded by the parties to the notarized transactions as proof of the notarized transactions without the need for third parties to record the notarized transactions. In some embodiments, a signature is a hash of a transaction that is signed using a private key of a signer. In some embodiments, the proposed transaction is between the first party, the second party, and a third party and the method verifies that the notarized transaction has been accepted by the third party by ensuring that the notarized transaction has been signed by the third party. In some embodiments, the method generates checkpoints during execution of the protocol flow, each checkpoint including state of the protocol flow at the time of the checkpoint and stores the checkpoints persistently so that if execution of the protocol flow is suspended, execution can be resumed from the latest checkpoint. In some embodiments, the generating of the checkpoints is transparent to the protocol flow. In some embodiments, the method tracks a status of the protocol flow for reporting to the first party. In some embodiments, the method, prior to execution of a protocol flow, rewrites the protocol flow so that the protocol flow is resumable. In some embodiments, the proposed transaction includes multiple input states and multiple output states. In some embodiments, the transaction includes a command as an input parameter to the contract code. In some embodiments, the command has one or more associated identification of parties and wherein verification of the proposed transaction by the contract code ensures that the proposed transaction has been signed by the identified parties. In some embodiments, the identification of a party is a public key. In some embodiments, the transaction includes an attachment with content that is accessible by the contract code. In some embodiments, a processor of the computing system executes instructions of a protocol flow by executing a virtual machine the executes bytecodes of the protocol flow. In some embodiments, the virtual machine is a Java virtual machine. In some embodiments, the method receives a request to provide a notarized transaction on which the proposed transaction depends, retrieves the notarized transaction on which the proposed transaction depends from the decentralized storage, and provides the retrieved transaction to the second party. In some embodiments, the method requests assistance for the protocol flow when an error condition is detected. In some embodiments, the method securely and reliably sends messages between a node of the first party and a node of the second party. In some embodiments, the method provides receipts to confirm delivery of messages.

In some embodiments, a distributed ledger system provides a method performed by a computing system for coordinating a transaction between parties. The method receives a proposed transaction between a first party and a second party. The proposed transaction being proposed and signed by the first party. The proposed transaction specifies state that includes at least an input state or an output state, and specifies an identifier of a notary. The state has contract code for verifying the proposed transaction complies with terms of a contract. The method verifies the proposed transaction has been signed by the first party. The method further verifies the proposed transaction by verifying that the input state is valid and executing the contract code of the state to ensure that the proposed transaction complies with the terms of the contract. The method generates an accepted transaction by signing the proposed transaction with a signature of the second party and coordinating with the notary identified in the transaction to have the accepted transaction notarized to generate a notarized transaction. The method sends the notarized transaction to the first party. The method records the notarized transaction in a decentralized storage so that the notarized transaction is accessible by the second party. In some embodiments, the decentralized storage allows notarized transactions to be recorded by the parties to the notarized transaction as proof of the notarized transactions without the need for third parties to record the notarized transactions. In some embodiments, a signature is a hash of a transaction that is signed using a private key of a signer. In some embodiments, the method generates checkpoints during execution of the protocol flow. Each checkpoint includes state of the protocol flow at the time of the checkpoint. The method stores the checkpoints persistently so that if execution of the protocol flow is suspended, execution can be resumed from the latest checkpoint. In some embodiments, the generating of the checkpoints is transparent to the protocol flow. In some embodiments, the method tracks a status of the protocol flow for reporting to the second party. In some embodiments, the method prior to execution of the instructions of the protocol flow, rewrites the instructions of the protocol flow so that the protocol flow is resumable. In some embodiments, the proposed transaction includes zero or more input states and zero or more output states. In some embodiments, the transaction further includes a command as an input parameter to the contract code. In some embodiments, the command has one or more associated identification of parties and wherein verification of the proposed transaction by the contract code ensures that the proposed transaction has been signed by the identified parties. In some embodiments, the identification of a party is a public key. In some embodiments, a processor of the computing system executes a virtual machine that executes bytecodes of the a protocol flow. In some embodiments, the virtual machine is a Java virtual machine. In some embodiments, the method prior to execution of the contract code, rewrites contract code so that the contract code is deterministic. In some embodiments, the state is input state that is an output state of an input transaction, and the method executes contract code of the output state of the input transaction to determine whether input transaction and the input state are valid. In some embodiments, the method transitively verifies the validity of input states on which the proposed transaction depends. In some embodiments, the method sends to the first party request to provide notarized transaction on which the proposed transaction depends and receive from the first party the requested notarized transaction. In some embodiments, the method requests assistance for the protocol flow when an error condition is detected. In some embodiments, the method securely and reliably sends messages between a node of an entity and a node of the another entity. In some embodiments, the method provides receipts to confirm delivery of messages. In some embodiments, the method translates an identifier of an entity to a network address for delivery of a message to that entity.

In some embodiments, a method performed by a computing system for notarizing a proposed transaction between parties is provided. The method receives from a second party a request to notarize an accepted transaction between a first party and the second party. The accepted transaction is proposed by the first party and signed by the first party and the second party. The accepted transaction specifies a state that includes at least an input state or an output state and specifies an identifier of the notary. The state has contract code for verifying the transaction complies with terms of a contract. The method accesses a consumed state storage to determine whether any input state has been consumed. When no input state has previously been consumed, the method generates a notarized transaction by signing the proposed transaction, sends to the second party the notarized transaction, and stores in the consumed state storage an indication that that any input state has been consumed. When an input state has previously been consumed, the method notifies the second party that the transaction cannot be notarized. In some embodiments, the method verifies that the accepted transaction is signed by the first party and the second party.

In some embodiments, a method performed by a computing system for providing a protocol framework to support protocol flows is provided. The method instantiates a protocol flow for execution. The method verifies a proposed transaction that specifies state that includes at least an input state or an output state and specifies an identifier of a notary. The state has contract code for verifying the proposed transaction complies with terms of a contract. The verifying includes verifying that the proposed transaction is signed by an authorized party and resolving the proposed transaction to ensure that the input state is valid by executing the contract code of the state and transitively ensuring that any input state is a valid output state of another transaction by executing contract code of the output state of the other transaction. The method generates checkpoints during execution of the protocol flow for restarting a protocol flow. In some embodiments, the method coordinates the sending of and receiving of messages for the protocol flow. In some embodiments, the method provides a mapping of identities of entities to addresses of nodes of the entities. In some embodiments, the method receives status update from the protocol and publish the status updates. In some embodiments, the method invokes a schedule function of contact code of the output state of a notarized transaction to determine when a protocol flow for generating a proposed transaction that inputs the output state is to be instantiated and executed.

In some embodiments, a method performed by a computing system is provided to ensure deterministic operations of code executed by a virtual machine. The method modifies the code by instrumenting the code so that execution of expensive operations are terminated deterministically. The method modifies the code to disable catching of certain exceptions. The method modifies the code by relinking references of the code from standard functions of a standard runtime library to shadow functions of a shadow runtime library. The shadow functions are deterministic versions of the standard functions. The method modifies the code to ensure that floating point operations are performed deterministically. The method stores the modified code for subsequent execution by the virtual machine.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A computing system for providing a protocol framework to support protocol flows, the computing system comprising:
one or more computer-readable storage mediums for storing computer-executable instructions for controlling the computing system to:
instantiate a protocol flow for execution; and
verify a proposed transaction between a first party and a second party is valid, the proposed transaction specifying state that includes an input state, an output state, a contract code, and an identification of a notary computing node of a distributed ledger system, the verifying including:
verifying that the proposed transaction is signed by the first party; and
resolving the proposed transaction by executing the contract code to determine whether the input state and the output state are valid and by ensuring that the input state is output state of another transaction that is valid;
transmit the proposed transaction to the notary computing node;
based on transmitting the proposed transaction to the notary computing node, generate a checkpoint comprising content associated with computer code of the protocol flow;
based on detecting a termination of the protocol flow, use the checkpoint to resume execution of the protocol flow;
receive, from the notary computing node, a notarized transaction;
verify that the notarized transaction has been signed by the notary computing node;
record the notarized transaction on one or more ledgers associated with the first party and the second party, without recording the notarized transaction on other ledgers corresponding to parties that are not associated with the notarized transaction; and
one or more processors for executing the computer-executable instructions stored in the one or more computer-readable storage mediums.

2. The computing system of claim 1 wherein the instructions control the computing system to ensure the input state is valid output state of a second transaction by executing contract code of the output state of the second transaction.

3. The computing system of claim 1 wherein ensuring that the input state is output state of another transaction that is valid comprises transitively ensuring that any input state of the other transaction is valid output of a third transaction.

4. The computing system of claim 1 wherein the instructions control the computing system to generate checkpoints during execution of the protocol flow for restarting the protocol flow.

5. The computing system of claim 1 wherein the instructions control the computing system to coordinate sending and receiving messages for the protocol flow.

6. The computing system of claim 1 wherein the instructions control the computing system to provide a mapping of identities of entities to addresses of nodes of the entities.

7. The computing system of claim 1 wherein the instructions control the computing system to receive a status update from the protocol flow and publish the status update.

8. The computing system of claim 1 wherein the instructions control the computing system to invoke a schedule function of contract code of the output state of a transaction to determine when a second protocol flow for generating a proposed transaction that inputs the output state is to be executed.

9. The computing system of claim 1 wherein the instructions control the computing system to rewrite the protocol flow so that the protocol flow is resumable.

10. The computing system of claim 1 wherein the instructions control the computing system to submit the proposed transaction to a notary to determine whether the output state of the other transaction has been consumed.

11. The computing system of claim 1 wherein the instructions control the computing system to ensure that the contract code executes deterministically.

12. The computing system of claim 1 wherein the instructions control the computing system to rewrite the contract code by performing one or more of checking for forbidden constructs, instrumenting expensive bytecodes, disabling forbidden exception caching, relinking references in constant pool, and ensuring deterministic floating-point operation.

13. A non-transitory computer-readable medium comprising computer-executable instructions, that when executed by one or more processors, causes operations comprising:
instantiating a protocol flow for execution; and
verifying a proposed transaction between a first party and a second party is valid, the proposed transaction specifying state that includes an input state, an output state, contract code, and an identification of a notary computing node of a distributed ledger system, the verifying including:
  verifying that the proposed transaction is signed by the first party; and
  resolving the proposed transaction by executing the contract code to determine whether the input state and the output state are valid and by ensuring that the input state is output state of another transaction that is valid;
transmitting the proposed transaction to the notary computing node;
based on transmitting the proposed transaction to the notary computing node, generating a checkpoint comprising content associated with computer code of the protocol flow;
based on detecting a termination of the protocol flow, using the checkpoint to resume execution of the protocol flow;
receiving, from the notary computing node, a notarized transaction;
verifying that the notarized transaction has been signed by the notary computing node; and
recording the notarized transaction on one or more ledgers associated with the first party and the second party, without recording the notarized transaction on other ledgers corresponding to parties that are not associated with the notarized transaction.

14. The non-transitory computer-readable medium of claim 13 wherein the ensuring that the input state is valid output state of another transaction comprises executing contract code of the output state of the other transaction.

15. The non-transitory computer-readable medium of claim 14 wherein the ensuring comprises transitively ensuring that any input state of the other transaction is valid output state of another transaction.

16. The non-transitory computer-readable medium of claim 13 wherein the computer-executable instructions further include a component to generate checkpoints during execution of the protocol flow for restarting the protocol flow.

17. The non-transitory computer-readable medium of claim 13 wherein the computer-executable instructions further include a component to coordinate sending and receiving messages for the protocol flow.

18. The non-transitory computer-readable medium of claim 13 wherein the computer-executable instructions further include a component to map identities of entities to addresses of nodes of the entities.

19. The non-transitory computer-readable medium of claim 13 wherein the computer-executable instructions further include a component to receive a status update from the protocol flow and publish the status update.

20. The non-transitory computer-readable medium of claim 13 wherein the computer-executable instructions further include a component to invoke a schedule function of contract code of output state of a transaction to determine when a second protocol flow for generating a proposed transaction that inputs the output state is to be instantiated and executed.

21. The non-transitory computer-readable medium of claim 13 wherein the computer-executable instructions further include a component to rewrite the protocol flow so that the protocol flow is resumable.

22. The non-transitory computer-readable medium of claim 21 wherein a rewritten protocol flow implements a resumable state machine.

23. The non-transitory computer-readable medium of claim 13 wherein the computer-executable instructions further include a component to rewrite the contract code by performing one or more of checking for forbidden constructs, instrumenting expensive bytecodes, disabling forbidden exception caching, relinking references in constant pool, and ensuring deterministic floating-point operation.

24. A method performed by one or more computing systems for supporting protocol flows, the method comprising:
  instantiating a protocol flow for execution; and
  verifying a proposed transaction between a first party and a second party is valid, the proposed transaction specifying state that includes an input state, an output state, contract code, and an identification of a notary computing node of a distributed ledger system, the verifying including:
    verifying that the proposed transaction is signed by the first party; and
    resolving the proposed transaction by executing the contract code to determine whether the input state and the output state are valid and by ensuring that the input state is output state of another transaction that is valid;
  transmitting the proposed transaction to the notary computing node;
  based on transmitting the proposed transaction to the notary computing node, generating a checkpoint comprising content associated with computer code of the protocol flow;
  based on detecting a termination of the protocol flow, using the checkpoint to resume execution of the protocol flow;
  receiving, from the notary computing node, a notarized transaction;
  verifying that the notarized transaction has been signed by the notary computing node; and
  recording the notarized transaction on one or more ledgers associated with the first party and the second party, without recording the notarized transaction on other ledgers corresponding to parties that are not associated with the notarized transaction.

25. The method of claim 24 further comprising ensuring that the contract code executes deterministically.

26. The method of claim 24 further comprising executing contract code of the output state of the other transaction to determine whether that output state is valid.

27. The method of claim 24 further comprising generating checkpoints during execution of the protocol flow for restarting the protocol flow.

28. The method of claim 24 further comprising invoking contract code to determine when a protocol flow for generating a proposed transaction that inputs the output state of the proposed transaction to be executed.

29. The method of claim 24 further comprising rewriting the protocol flow so that the protocol flow is resumable.

* * * * *